United States Patent
Kim

(10) Patent No.: US 12,125,976 B2
(45) Date of Patent: *Oct. 22, 2024

(54) MULTI-LAYER STRUCTURED COMPOSITE ELECTROLYTE AND SECONDARY BATTERY USING SAME

(71) Applicant: Jae Kwang Kim, Changwon-si (KR)

(72) Inventor: Jae Kwang Kim, Changwon-si (KR)

(73) Assignee: SEVEN KING ENERGY CO., LTD., Seongnam-si (KR)

(*) Notice: Subject to any disclaimer, the term of this patent is extended or adjusted under 35 U.S.C. 154(b) by 249 days.

This patent is subject to a terminal disclaimer.

(21) Appl. No.: 16/586,748

(22) Filed: Sep. 27, 2019

(65) Prior Publication Data

US 2020/0036039 A1 Jan. 30, 2020

Related U.S. Application Data

(63) Continuation of application No. PCT/KR2018/003179, filed on Mar. 19, 2018.

(30) Foreign Application Priority Data

Mar. 28, 2017 (KR) ........................ 10-2017-0039296

(51) Int. Cl.
*H01M 10/0565* (2010.01)
*H01M 10/0525* (2010.01)
*H01M 10/0562* (2010.01)

(52) U.S. Cl.
CPC ... *H01M 10/0565* (2013.01); *H01M 10/0525* (2013.01); *H01M 10/0562* (2013.01); *H01M 2300/0068* (2013.01)

(58) Field of Classification Search
CPC ......... H01M 10/0565; H01M 10/0525; H01M 10/0562; H01M 2300/0068;
(Continued)

(56) References Cited

U.S. PATENT DOCUMENTS 9,029,023 B2 * 5/2015 Choi ................... H01M 10/056
429/303
2003/0180623 A1 9/2003 Yun et al.
(Continued)

FOREIGN PATENT DOCUMENTS

CN 1259773 A 7/2000
CN 1463051 A 12/2003
(Continued)

OTHER PUBLICATIONS

Arshad et al., Dielectric and Structural Properties of Poly (vinylidene fluoride) (PVDF) and Poly (vinylidene fluoride-trifluoroethylene) (PVDF-TrFE) Filled with Magnesium Oxide Nanofillers, 2018, Hindawi, pp. 1-12. (Year: 2018).*
(Continued)

*Primary Examiner* — Christian Roldan
(74) *Attorney, Agent, or Firm* — Insight Law Group, PLLC; Seung Lee

(57) ABSTRACT

A multi-layer structured composite electrolyte for a secondary battery and a secondary battery using the same are provided. The multi-layer structured composite electrolyte is made by laminating two or more layers of a composite electrolyte including a small amount of a liquid electrolyte in a mixture of a polymer and a ceramic material. The multi-layer structured composite electrolyte has the same stability as a solid electrolyte and has the same or better electrochemical properties as or than the liquid electrolyte. Since the multi-layer structured composite electrolyte of the present invention can be folded arbitrarily, the multi-layer structured composite electrolyte may be used in a wearable device.

20 Claims, 21 Drawing Sheets

(58) Field of Classification Search
CPC ....... H01M 50/411; H01M 2300/0025; H01M 2300/0082; H01M 10/054; H01M 10/056; H01M 50/431; H01M 50/446; H01M 50/46; H01M 10/052; H01M 2300/0045; Y02E 60/10
USPC .......................................................... 429/303
See application file for complete search history.

(56) References Cited

U.S. PATENT DOCUMENTS

| | | | |
|---|---|---|---|
| 2010/0113243 A1* | 5/2010 | Inda | C03C 10/00 65/33.9 |
| 2010/0261065 A1 | 10/2010 | Babinec et al. | |
| 2011/0281154 A1* | 11/2011 | Vissers | H01G 11/16 562/587 |
| 2011/0300439 A1* | 12/2011 | Iwaya | H01M 10/052 429/200 |
| 2012/0231321 A1 | 9/2012 | Huang et al. | |
| 2012/0298524 A1* | 11/2012 | Hammad | C10G 45/00 205/688 |
| 2013/0260232 A1* | 10/2013 | Lu | H01M 4/0445 429/211 |
| 2013/0260257 A1 | 10/2013 | Choi | |
| 2014/0166930 A1* | 6/2014 | Hamamoto | H01M 10/0525 252/182.1 |
| 2016/0013463 A1 | 1/2016 | Roumi et al. | |
| 2016/0190641 A1* | 6/2016 | Lee | C08F 212/30 429/188 |
| 2016/0248100 A1* | 8/2016 | Joo | H01M 4/8882 |
| 2017/0025658 A1 | 1/2017 | Shi et al. | |
| 2017/0271714 A1* | 9/2017 | Iwasaki | H01M 4/587 |
| 2018/0006326 A1* | 1/2018 | O'Neill | H01M 4/131 |
| 2018/0040904 A1* | 2/2018 | Choi | H01M 8/0221 |
| 2019/0296394 A1* | 9/2019 | Iwasaki | H01M 4/13 |

FOREIGN PATENT DOCUMENTS

| | | |
|---|---|---|
| CN | 101124693 A | 2/2008 |
| CN | 102576907 A | 7/2012 |
| CN | 103746089 A | 4/2014 |
| EP | 1760819 A2 | 3/2007 |
| JP | H11-149823 A | 6/1999 |
| KR | 10-2000-0076988 A | 12/2000 |
| KR | 2003-0007659 A | 1/2003 |
| KR | 10-2010-0068167 A | 6/2010 |
| KR | 10-2015-0129181 A | 11/2015 |
| KR | 10-2015-0143365 A | 12/2015 |
| KR | 10-2016-0026648 A | 3/2016 |
| TW | 201042802 A | 12/2010 |

OTHER PUBLICATIONS

Zhu et al., Structure and Properties relationships of beta-Al2O3 electrolyte materials, 2011, Elsevier, Journal of Alloys and Compounds, pp. 182-185. (Year: 2011).*
International Search Report for PCT/KR2018/003179, mailed Sep. 19, 2018, and its English translation.
Extended European Search Report mailed Dec. 22, 2020 for European Application No. 18776847.8.
Japanese office action mailed Oct. 19, 2021 for Japanese Application No. 2019-553474.
Chinese office action mailed Apr. 21, 2023 from the Chinese Patent Office for Chinese Application No. 201880022153.2.
Chinese office action mailed Jul. 18, 2022 from the Chinese Patent Office for Chinese Application No. 201880022153.2.
Chinese office action mailed Oct. 27, 2022 from the Chinese Patent Office for Chinese Application No. 201880022153.2.
Extended European Search Report mailed on Dec. 8, 2023 from the European Patent Office for European Application No. 18776847.8.
Chinese office action mailed on Jun. 3, 2024 from the Chinese Patent Office for Chinese Application No. 201880022153.2.
Jia Hongbing et al., "Polymer Materials", Nanjing University Press, ISBN 978-7-305-05694-9, 1st edition, 1st printing in Nov. 2009, cover page, pp. 167-168, published on Nov. 30, 2009.

* cited by examiner

MULTI-LAYER STRUCTURED COMPOSITE ELECTROLYTE AND SECONDARY BATTERY USING SAME

CROSS-REFERENCE TO RELATED APPLICATIONS

This application is a Continuation of International Application No. PCT/KR2018/003179, filed on Mar. 19, 2018, which claims the benefit of and priority to Korean Patent Application No. 10-2017-0039296, filed on Mar. 28, 2017, the content of which are herein incorporated by reference in their entirety.

TECHNICAL FIELD

The present invention relates to a multi-layer structured composite electrolyte for a secondary battery and a secondary battery using the same. The multi-layer structured composite electrolyte of the present invention is made by laminating two or more layers of a composite electrolyte including a small amount of a liquid electrolyte in a mixture of a polymer and a ceramic material. The multi-layer structured composite electrolyte of the present invention has the same stability as a solid electrolyte and has the same or better electrochemical properties as or than the liquid electrolyte. Since the multi-layer structured composite electrolyte of the present invention can be folded arbitrarily, the multi-layer structured composite electrolyte may be used in a wearable device.

BACKGROUND

Applications of secondary batteries capable of charging and discharging are expanding day by day from portable devices such as mobile phones, laptops and camcorders to electric vehicles. In general, the secondary battery is constituted by a positive electrode, a negative electrode, and an electrolyte and a polymer separator therebetween.

Currently, the most widely used secondary battery is a lithium ion secondary battery. Lithium ion secondary batteries use an ion conductive organic liquid electrolyte in which salts are dissolved in a liquid electrolyte, particularly, a non-aqueous organic solvent. However, the liquid electrolyte is inherently vulnerable to heat and impact and highly flammable. Therefore, there is a problem in that lithium ion secondary batteries may be damaged from impacts applied from the outside or exploded or burned when the temperature of the secondary battery increases.

In order to solve this problem, efforts have been made to replace the liquid electrolyte with a solid electrolyte such as a ceramic solid electrolyte and a polymer electrolyte. However, there is another problem in that these solid electrolytes have high stability, but have low ionic conductivity at room temperature and a high interface resistance with the electrodes, which results in deteriorated electrochemical characteristics of the secondary battery.

In order to solve this problem of the solid electrolyte, an attempt has been made to prepare a solid type composite electrolyte by mixing a ceramic material and a polymer and then including a small amount of the liquid electrolyte therein. The composite electrolyte prepared above increases not only thermal stability but also the electrochemical characteristics because it decreases interfacial resistance and contains lithium ion activated ceramics, thereby improving the movement of lithium ions.

However, since the positive and negative electrodes of the secondary battery have different electrochemical reactions and different required electrochemical properties, it is difficult to find an optimal polymer or ceramic to both the positive electrode and the negative electrode.

DISCLOSURE

Technical Problem

In order to solve the problems of existing composite electrolytes, an object of the present invention is to provide a multi-layer structured composite electrolyte using a composite electrolyte layer in a positive electrode unit comprising a polymer and a ceramic suitable for the positive electrode unit and a composite electrolyte layer in a negative electrode unit comprising a polymer and a ceramic suitable for the negative electrode unit, and a secondary battery using the same. Specifically, the present invention discloses a combination of polymers and ceramics suitable for the positive electrode unit and the negative electrode unit to improve the performance of the composite electrolyte.

Technical Solution

A multi-layer structured composite electrolyte for a secondary battery according to the present invention is a composite electrolyte for a secondary battery, comprising a first composite electrolyte layer positioned toward a positive electrode and a second composite electrolyte layer positioned toward a negative electrode, in which the first composite electrolyte layer and the second composite electrolyte layer include different polymers and ceramic materials, respectively. The first composite electrolyte layer and the second composite electrolyte layer further include liquid electrolytes.

The multi-layer structured composite electrolyte for the secondary battery according to the present invention may comprise an additional electrolyte layer of a single layer or multilayer positioned between the first composite electrolyte layer and the second composite electrolyte layer. The additional electrolyte layer may comprise a polymer and a ceramic material. The additional electrolyte layer may comprise a liquid electrolyte.

The first composite electrolyte layer according to the present invention has superior stability, reactivity, and the like at the positive electrode than the second composite electrolyte layer, and the second composite electrolyte layer has superior stability, reactivity, and the like at the negative electrode than the first composite electrolyte layer. The first composite electrolyte layer and the second composite electrolyte layer according to the present invention include different ceramic materials and/or different polymers, respectively.

Advantageous Effects

In the related art, there have been attempts to apply a solid electrolyte or a composite electrolyte to solve the stability problem of a secondary battery using a liquid electrolyte. The solid electrolyte is made of only a polymer or ceramic. The polymeric solid electrolyte has low ionic conductivity at room temperature and the ceramic solid electrolyte has high interface resistance with the electrode. The composite electrolyte may be made of ceramics and polymers. The composite electrolyte also may be prepared by adding liquid electrolytes to ceramics and polymers. Since the composite electrolyte was prepared only in a single layer, the composite electrolyte does not satisfy the characteristics for the positive and negative electrodes of the secondary battery.

On the contrary, the multi-layer structured composite electrolyte for the secondary battery according to the present invention has high ion conductivity, reduces the interface resistance with the electrode, and satisfies the respective characteristics required in the positive electrode and the negative electrode.

The secondary battery using the multi-layer structured composite electrolyte according to the present invention has an advantage of having excellent thermal stability and excellent capacity, and maintaining a capacity without a large decrease as a charge-discharge cycle proceeds.

The secondary battery using the multi-layer structured composite electrolyte according to the present invention has an advantage that the secondary battery itself is bent freely. Therefore, the present invention may be freely applied to wearable products and the like.

MODES OF THE INVENTION

Figure 1:
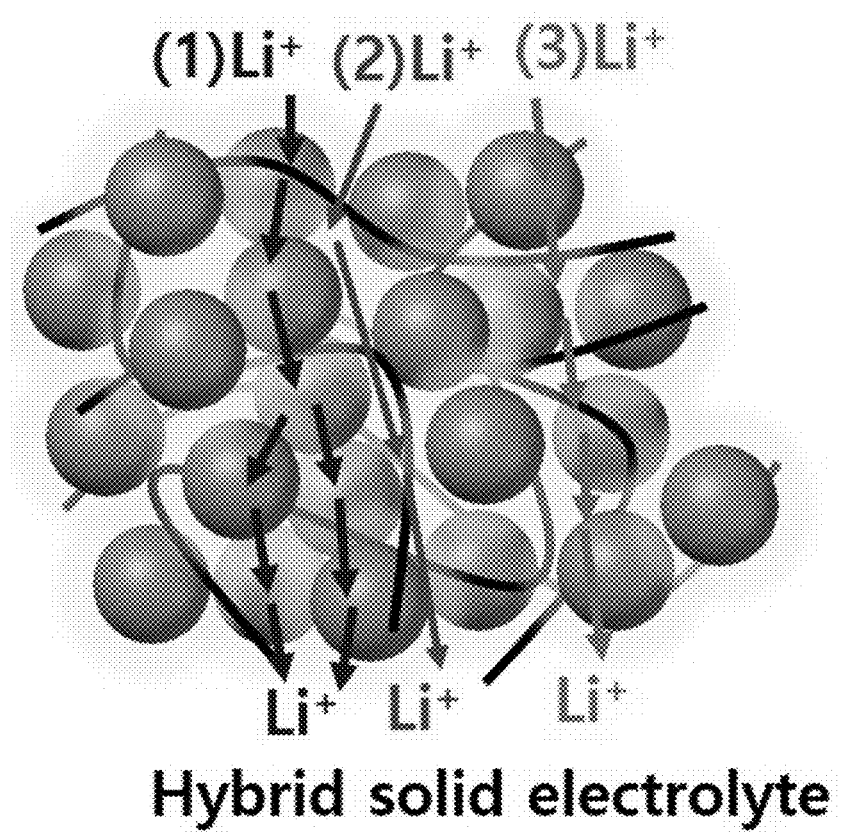
FIG. 1 illustrates three paths through which lithium or sodium ions move in a composite electrolyte.

The composite electrolyte layer of the present invention may include a ceramic material, a polymer, and a liquid electrolyte. When the ceramic material and the polymer are 100 wt %, the ceramic material may be 99 wt % to 40 wt %, and the polymer may be 1 wt % to 60 wt %. The ceramic material is preferably 80 wt % to 70 wt % and the polymer is preferably 20 wt % to 30 wt %. The liquid electrolyte may be 5 parts by weight to 40 parts by weight based on 100 parts by weight of the ceramic material and the polymer. The liquid electrolyte preferably may be 10 parts by weight to 20 parts by weight based on 100 parts by weight of the ceramic material and the polymer.

The ceramic material may be sulfides, oxides, phosphates, or mixtures thereof. A sulfide ceramic is a ceramic containing a sulfur element in a crystal structure, such as Li$_2$S—P$_2$S$_5$, Li$_7$P$_2$S$_{11}$, Li$_{3.25}$Ge$_{0.25}$P$_{0.75}$S$_4$ (LGPS), Li$_2$S—Si$_2$S$_5$, Li$_2$S—Ga$_2$S$_3$—GeS$_2$, and Li$_2$S—Sb$_2$S$_3$—GeS$_2$. The oxide ceramic is a ceramic containing oxygen element in a crystal structure, such as Al$_2$O$_3$, β-Al$_2$O$_3$, TiO$_2$, BaTiO$_3$, SiO$_2$, (La,Li)TiO$_3$(LLTO), Li$_5$La$_3$Ta$_2$O$_{12}$, Li$_4$SiO$_4$ Li$_3$BO$_{2.5}$N$_{0.5}$, and Li$_9$SiAlO$_8$. The phosphate ceramic is a ceramic containing a phosphorus element in a crystal structure, such as LAGP (Li$_{1+x}$Al$_x$Ge$_{2-x}$(PO$_4$)$_3$) (0<x<2), LTAP (Li$_{1+x}$Ti$_{2-x}$Al$_x$(PO$_4$)$_3$) (0<x<2), and Li$_{1+x}$Ti$_{2-x}$Al$_x$Si$_y$(PO$_4$)$_{3-y}$ (0<x<2, 0<y<3).

The polymer may be polyvinylidene fluoride (PVdF)-based polymers and copolymers thereof, poly[(vinylidene fluoride-co-trifluoroethylene]-based polymers and copolymers thereof, polyethylene glycol (PEO)-based polymers and copolymers thereof, polyacrylonitrile (PAN)-based polymers and copolymers thereof, poly(methyl methacrylate) (PMMA)-based polymers and copolymers thereof, polyvinyl chloride-based polymers and copolymers thereof, polyvinylpyrrolidone (PVP)-based polymers and copolymers thereof, polyimide (PI)-based polymers and copolymers thereof, polyethylene (PE)-based polymers and copolymers thereof, polyurethane (PU)-based polymers and copolymers thereof, polypropylene (PP)-based polymers and copolymers thereof, poly(propylene oxide) (PPO)-based polymers and copolymers thereof, poly(ethylene imine) (PEI)-based polymers and copolymers thereof, poly(ethylene sulfide) (PES)-based polymers and copolymers thereof, poly(vinyl acetate) (PVAc)-based polymers and copolymers thereof, poly(ethylene succinate) (PESc)-based polymers and copolymers thereof, polyester-based polymers and copolymers thereof, polyamine-based polymers and copolymers thereof, polysulfide-based polymers and copolymers thereof, siloxane-based polymers and copolymers thereof, styrene butadiene rubber (SBR)-based polymers and copolymers thereof, carboxymethyl cellulose (CMC)-based polymers and copolymers thereof, derivatives thereof, and combinations thereof.

The liquid electrolyte may be formed by dissolving a lithium salt or a sodium salt in a non-aqueous organic solvent or an ionic liquid solvent, but is not limited thereto and may include all kinds of liquid electrolytes commonly used in the art. The non-aqueous organic solvent may be carbonate-based, ester-based, ether-based, ketone-based, alcohol-based, and aprotic solvents, or combinations thereof. The ionic liquid solvent may be imidazolium-based, pyridinium-based, pyrrolidinium-based, sulfonium-based, pyrazolium-based, ammonium-based, morpholinium-based, phospholinium-based, and piperidinium-based cation solvents, or combinations thereof. The structures of the ionic liquid cations are as follows.

| Structure of Cation | imidazolium | pyridinium | ammonium |
|---|---|---|---|
| Name of Structure | imidazolium ion | pyridinium ion | ammonium ion |
| Structure of Cation | phosphonium | sulfonium | |
| Name of Structure | phosphonium ion | sulfonium ion | |
| Structure of Cation | pyrazolium | pyrrolidium | |
| Name of Structure | pyrazolium ion | pyrrolidium ion | |

The lithium salt used in the liquid electrolyte may be $LiClO_4$, $LiPF_6$, $CF_3SO_2NLiSO_2CF_3$(LiTFSI), $Li[N(SO_2F)_2]$(LiFSI), $Li[B(C_2O_4)_2]$(LiBOB), $LiAsF_6$, lithium fluorosulfonyl-trifluoromethanesulfonylimide (LiFTFSI), or a combination thereof.

The sodium salt used in the liquid electrolyte may be $NaClO_4$, $NaPF_4$, $NaPF_6$, $NaAsF_6$, NaTF $Na[(C_2F_5)_3PF_3]$ (NaFAP), $Na[B(C_2O_4)_2]$(NaBOB), $Na[N(SO_2F)_2]$(NaFSI), NaBeti($NaN[SO_2C_2F_5]_2$), or a combination thereof.

Figure 21:
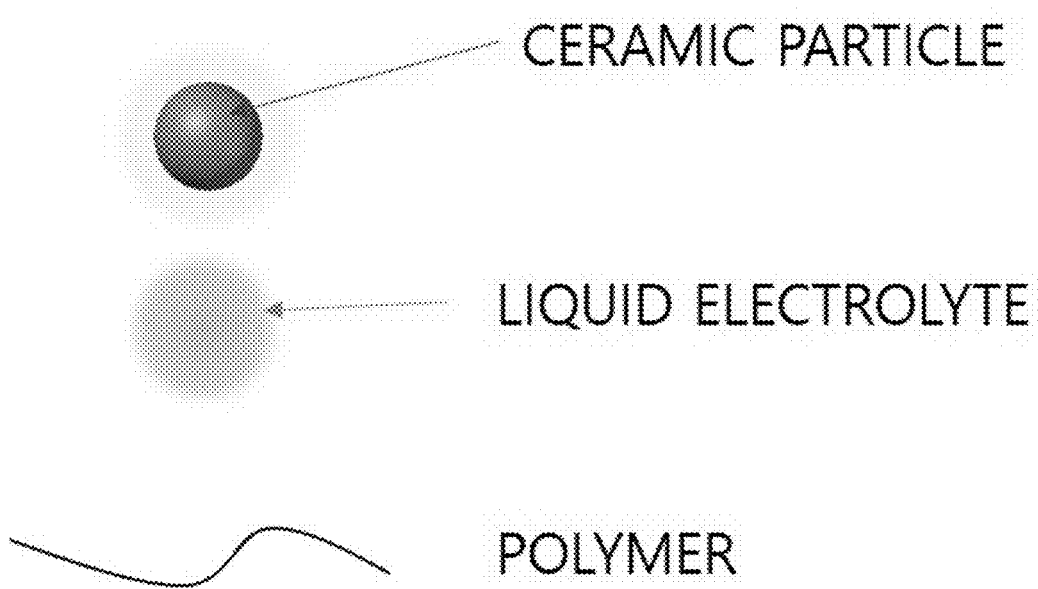
FIG. 21 shows a ceramic material, a liquid electrolyte and a polymer, which are the elements of composite electrolyte.

In the composite electrolyte, lithium or sodium ions move through three paths as follows.
(1) Movement through contacting ceramics (pumping movement)
(2) Movement through liquid electrolyte
(3) Movement across ceramic material and liquid electrolyte The three movement paths are shown in FIG. 1. The meaning of each figure in FIG. 1 is illustrated in FIG. 21.

The first composite electrolyte layer may use a ceramic material having good ionic conductivity. Oxides, phosphates, sulfides, etc. may be used. The use of ceramic materials with good ionic conductivity increases the electrochemical characteristics thereof. It is preferable to use a ceramic material having conductivity of $10^{-3}$ S/cm or more in the first composite electrolyte layer. For example, LTAP ($Li_{1+x}Ti_{2-x}Al_x(PO_4)_3$) (0<x<2), LAGP($Li_{1+x}Al_xGe_{2-x}(PO_4)_3$) (0<x<2), and LLTO($Li_{3x}La_{2/3-x}TiO_3$) (0<x<2/3) may be used as a ceramic material of the first composite electrolyte layer.

In addition, $Li_2S$—$P_2S_5$, $Li_2O$—$SiO_2$, $Li_7La_3Zr_2O_{12}$ (LLZO), Li-$\beta$-$Al_2O_3$, and $Li_{3.25}Ge_{0.25}P_{0.75}S_4$(LGPS) may be used as the ceramic material of the first composite electrolyte layer.

The second composite electrolyte layer may use a ceramic material of a garnet such as $Al_2O_3$, $Li_6La_2BaTa_2O_{12}$, and LLZO ($Li_7La_3Zr_2O_{12}$) and a composite such as LiX—$Al_2O_3$ (X may be I and N). The ceramic material used for the second composite electrolyte layer varies according to a type of negative electrode used in the secondary battery. For example, when lithium is used as the negative electrode, it is preferable not to use ceramics containing Ti, Si, S, and Ge. When graphite (carbon), silicon, or germanium is used as the negative electrode, it is preferable not to use ceramics containing Ti and S.

In addition, $\beta$-$Al_2O_3$, $Li_2O$—$SiO_2$, $Li_{3.25}Ge_{0.25}P_{0.75}S_4$ (LGPS), and LAGP($Li_{1+x}Al_xGe_{2-x}(PO_4)_3$) (0<x<2) may be used as ceramic materials of the second composite electrolyte layer.

The polymer used in the first composite electrolyte layer may be polyvinylidene fluoride (PVdF)-based polymers and copolymers thereof, poly[(vinylidene fluoride-co-trifluoroethylene]-based polymers and copolymers thereof, polyethylene glycol (PEO)-based polymers and copolymers thereof, polyacrylonitrile (PAN)-based polymers and copolymers thereof, poly(methyl methacrylate) (PMMA)-based polymers and copolymers thereof, polyvinyl chloride-based polymers and copolymers thereof, polyvinylpyrrolidone (PVP)-based polymers and copolymers thereof, polyimide (PI)-based polymers and copolymers thereof, polyethylene (PE)-based polymers and copolymers thereof, polyurethane (PU)-based polymers and copolymers thereof, polypropylene (PP)-based polymers and copolymers thereof, poly (propylene oxide) (PPO)-based polymers and copolymers thereof, poly(ethylene imine) (PEI)-based polymers and copolymers thereof, poly(ethylene sulfide) (PES)-based polymers and copolymers thereof, poly(vinyl acetate) (PVAc)-based polymers and copolymers thereof, poly(ethylene succinate) (PESc)-based polymers and copolymers thereof, polyester-based polymers and copolymers thereof, polyamine-based polymers and copolymers thereof, polysulfide-based polymers and copolymers thereof, siloxane-based polymers and copolymers thereof, styrene butadiene rubber (SBR)-based polymers and copolymers thereof, carboxymethyl cellulose (CMC)-based polymers and copolymers thereof, derivatives thereof, and combinations thereof.

When a charging voltage is set to 4.4 V or more, it is preferable to use polyvinylidene fluoride (PVdF)-based polymers and copolymers thereof. In addition, it is preferable to use polyacrylonitrile (PAN)-based polymers and copolymers thereof as a polymer of the first composite electrolyte layer.

The polymer used in the second composite electrolyte layer may use the polymer used in the first composite electrolyte layer. It is preferable to use polyacrylonitrile (PAN)-based polymers and copolymers thereof and polyurethane (PU)-based polymers and copolymers thereof having excellent strength and electrochemical stability. In addition, the styrene butadiene rubber (SBR)-based polymers and copolymers thereof and the carboxymethyl cellulose (CMC)-based polymers and copolymers thereof may be used as the polymer of the second composite electrolyte layer.

The multi-layer structured composite electrolyte layer may be prepared by using polyvinylidene fluoride (PVdF)-based polymers and copolymers thereof as the polymer of the first composite electrolyte layer, using a ceramic selected from phosphates, oxides, sulfides, and mixtures thereof as the ceramic material for the first composite electrolyte layer, using polyvinylidene fluoride (PVdF)-based polymers and copolymers thereof as the polymer of the second composite electrolyte layer, and using phosphates ceramic as the ceramic material for the second composite electrolyte layer.

The multi-layer structured composite electrolyte layer may be prepared by using PVdF as the polymer of the first composite electrolyte layer, using a ceramic selected from LTAP($Li_{1+x}Ti_{2-x}Al_x(PO_4)_3$) (0<x<2), LLZO ($Li_7La_3Zr_2O_{12}$), $Li_zS$—$P_2S_5$, and mixtures thereof as the ceramic material for the first composite electrolyte layer, using PVdF as the polymer of the second composite electrolyte layer, and using LAGP($Li_{1+x}Al_xGe_{2-x}(PO_4)_3$) (0<x<2) as the ceramic material for the second composite electrolyte layer.

The multi-layer structured composite electrolyte layer may be prepared by using polyvinylidene fluoride (PVdF)-based polymers and copolymers thereof as the polymer of the first composite electrolyte layer, using a ceramic selected from phosphates, oxides, sulfides, and mixtures thereof as the ceramic material for the first composite electrolyte layer, using polyvinylidene fluoride (PVdF)-based polymers and copolymers thereof as the polymer of the second composite electrolyte layer, and using an oxide ceramic as the ceramic material for the second composite electrolyte layer.

The multi-layer structured composite electrolyte layer may be prepared by using PVdF, polyvinylidene fluoride-trifluoroethylene (PVdF-TrFE), or mixtures thereof as the polymer of the first composite electrolyte layer, using LTAP ($Li_{1+x}Ti_{2-x}Al_x(PO_4)_3$) (0<x<2), LLTO ((La,Li)$TiO_3$), $Li_2S$—$P_2S_5$, and mixtures thereof as the ceramic material for the first composite electrolyte layer, using PVdF, PVdF-TrFE, or mixtures thereof as the polymer of the second composite electrolyte layer, and using $Al_2O_3$, $\beta$-$Al_2O_3$, LLZO ($Li_7La_3Zr_2O_{12}$), and mixtures thereof as the ceramic material for the second composite electrolyte layer.

The multi-layer structured composite electrolyte layer may be prepared by using polyacrylonitrile (PAN)-based polymers and copolymers thereof as the polymer of the first composite electrolyte layer, using a ceramic material selected from phosphates, oxides, sulfides, and mixtures thereof as the ceramic material for the first composite electrolyte layer, using polyacrylonitrile (PAN)-based polymers and copolymers thereof as the polymer of the second composite electrolyte layer, and using a sulfide ceramic as the ceramic material for the second composite electrolyte layer.

The multi-layer structured composite electrolyte layer may be prepared by using polyacrylonitrile (PAN) as the polymer of the first composite electrolyte layer, using a ceramic selected from LTAP($Li_{1+x}Ti_{2-x}Al_x(PO_4)_3$) (0<x<2), LLZO ($Li_7La_3Zr_2O_{12}$), $Li_2S$—$P_2S_5$, and mixtures thereof as the ceramic material for the first composite electrolyte layer, using polyacrylonitrile (PAN) as the polymer of the second composite electrolyte layer, and using LGPS ($Li_{3.25}Ge_{0.25}P_{0.75}S_4$), $Li_2O$—$SiO_2$, and mixtures thereof as the ceramic material for the second composite electrolyte layer.

SPECIFIC EXAMPLES

Example 1

Figure 2:
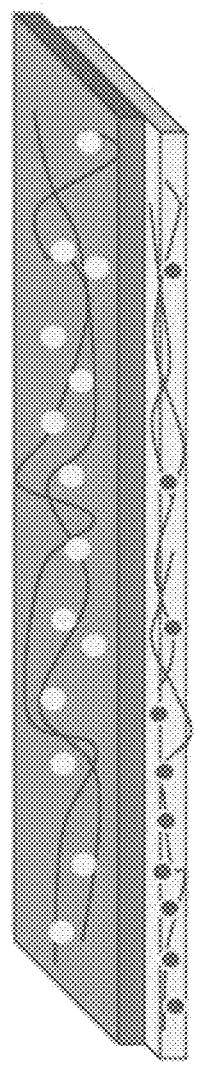
FIG. 2 is a schematic diagram of a multi-layer structured composite electrolyte formed by preparing a first composite electrolyte layer using LTAP (sometimes abbreviated as LTAPO) as a ceramic material, PVdF as a polymer, and 1 M LiPF$_6$ in EC/DMC (ethyl carbonate/dimethyl carbonate, 1:1 vol) as a liquid electrolyte, and preparing a second composite electrolyte layer using LLZO as a ceramic material, PVdF as a polymer, and 1 M LiPF$_6$ in EC/DMC (ethyl carbonate/dimethyl carbonate, 1:1 vol) as a liquid electrolyte, and then laminating the first composite electrolyte layer (upper layer) and the second composite electrolyte layer (lower layer).

A first composite electrolyte layer used LTAP as a ceramic material, PVdF as a polymer, and 1M $LiPF_6$ in EC/DMC (ethyl carbonate/dimethylcarbonate, 1:1 vol) as a liquid electrolyte, and a second composite electrolyte layer used LLZO as a ceramic material, PVdF as a polymer, and 1M $LiPF_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte. A schematic diagram of this multi-layer structured composite electrolyte was shown in FIG. 2.

Figure 3:
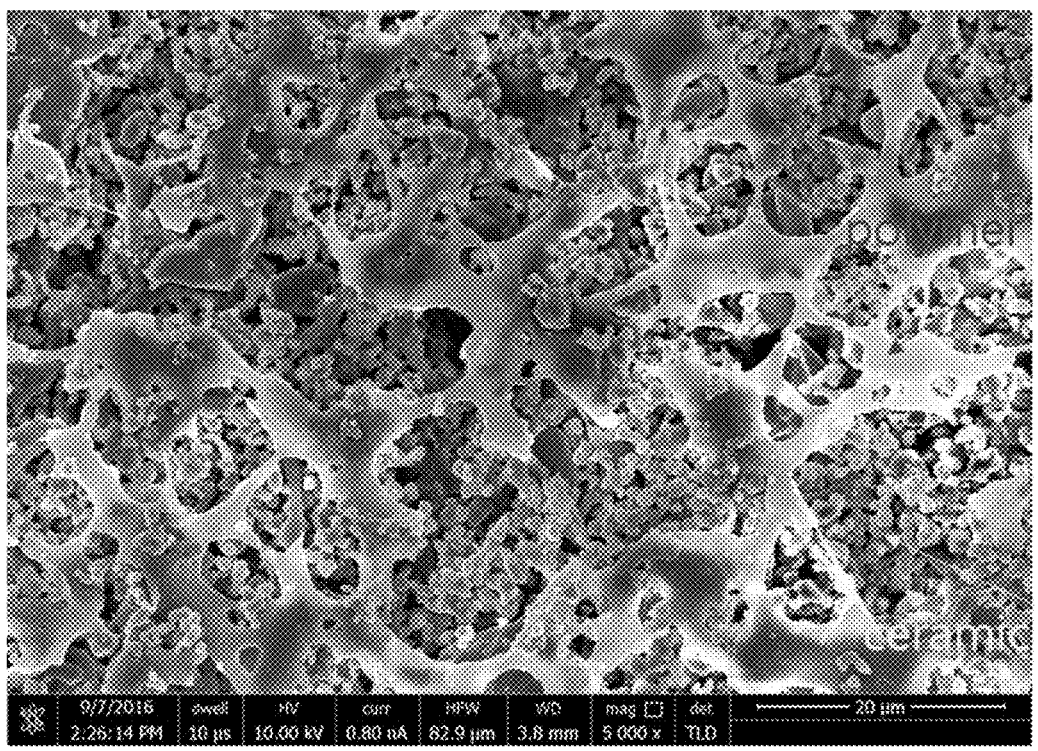
FIG. 3 is a SEM photograph of a surface of the first composite electrolyte layer of the multi-layer structured composite electrolyte layer of FIG. 2.
Figure 4:
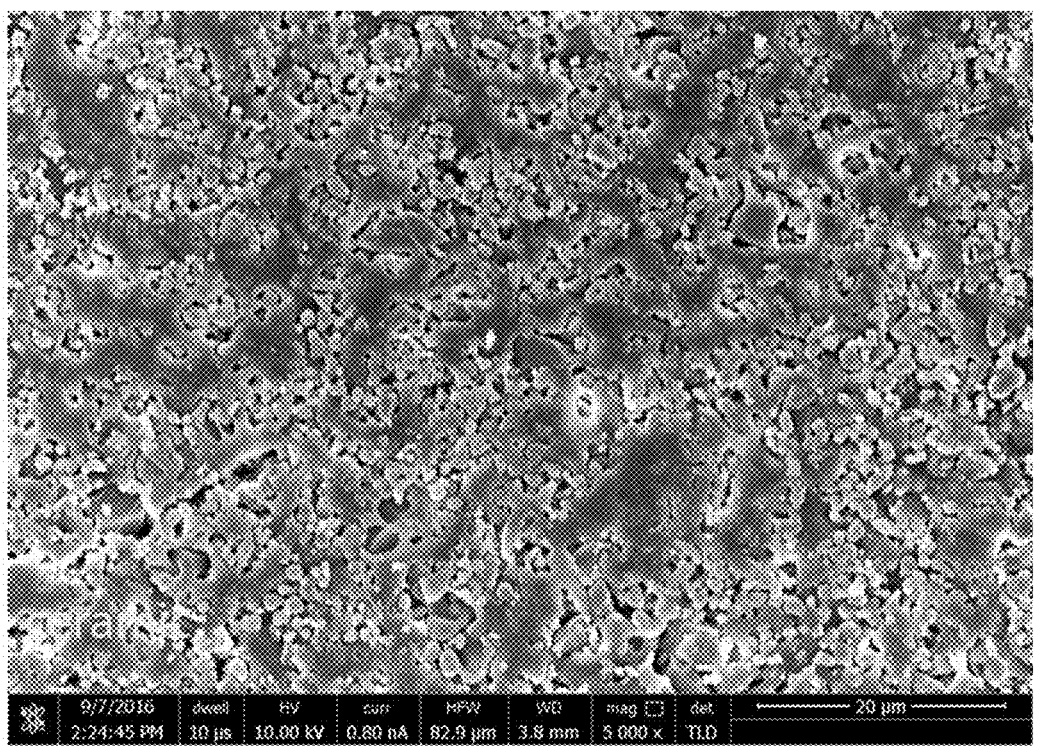
FIG. 4 is a SEM photograph of a surface of the second composite electrolyte layer of the multi-layer structured composite electrolyte layer of FIG. 2.
Figure 5:
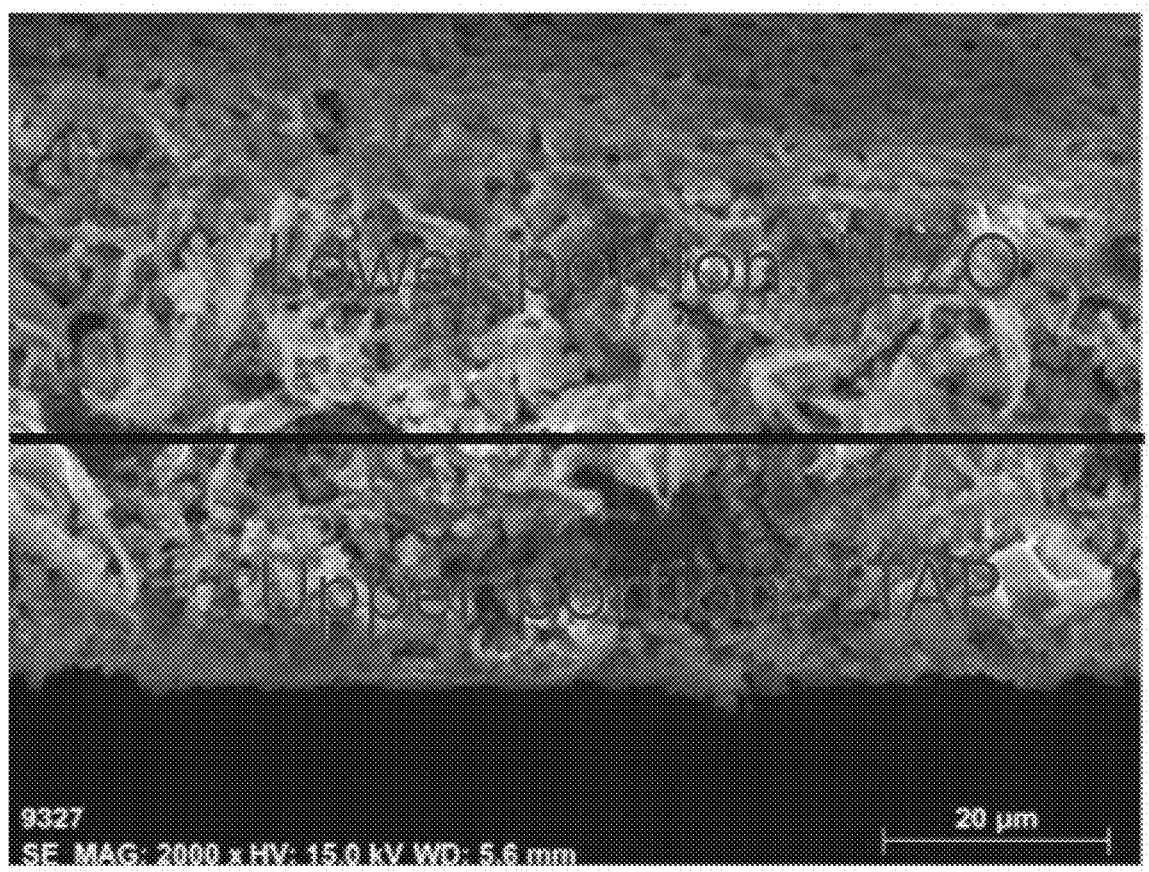
FIG. 5 is a SEM photograph of a cross-sectional surface of the multi-layer structured composite electrolyte layer of FIG. 2.
Figure 6:
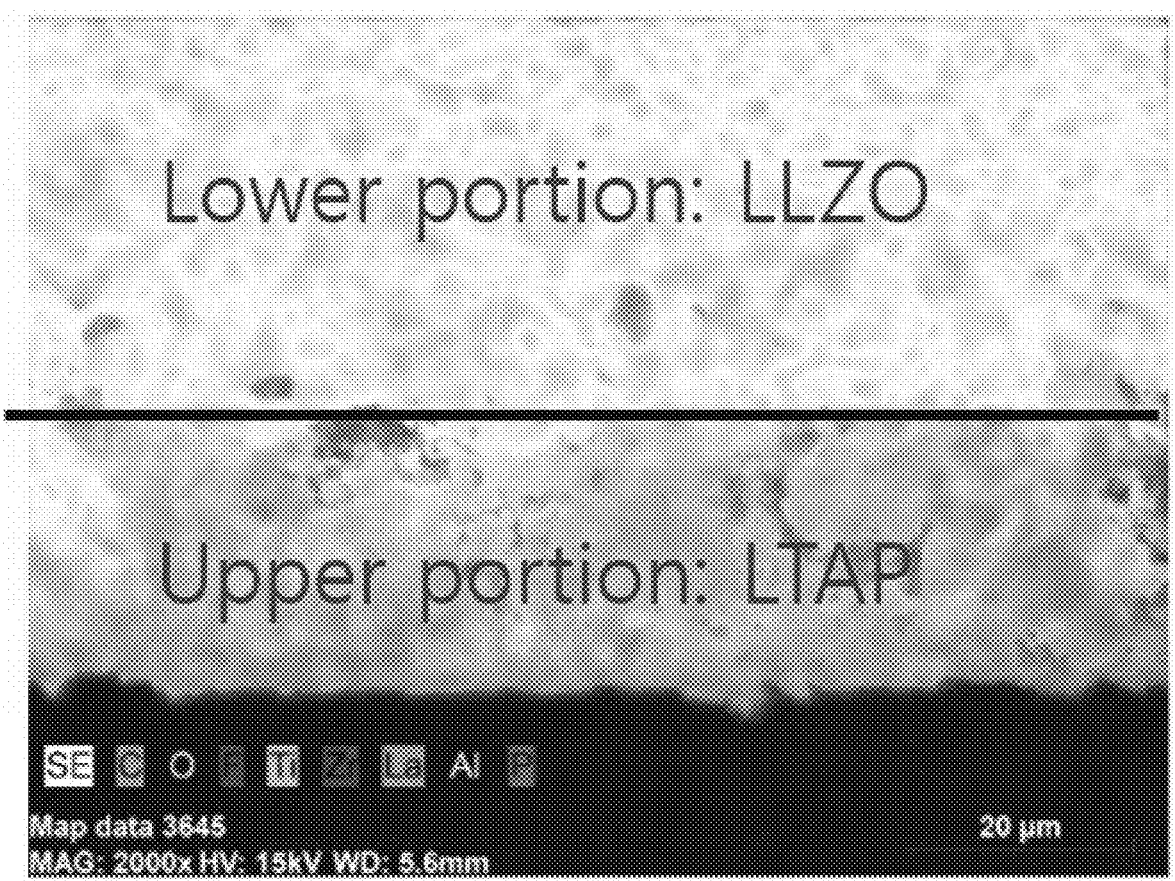
FIG. 6 is an SEM-EDS atomic analysis photograph of a cutting surface of the multi-layer structured composite electrolyte layer of FIG. 2.

A SEM photograph of a surface of the first composite electrolyte layer was shown in FIG. 3. A SEM photograph of a surface of the second composite electrolyte layer was shown in FIG. 4. A photograph of a cutting surface photograph of the multi-layer structured composite electrolyte was shown in FIG. 5, and an elemental analysis photograph of the cutting surface was shown in FIG. 6.

As shown in FIGS. 2 to 6, it can be seen that the structures of the first composite electrolyte layer and the second composite electrolyte layer are significantly different from each other because combinations of the ceramic materials and the polymers used are different from each other.

Example 2

A secondary battery of Example 2 was prepared using a $LiNi_{1/3}Mn_{1/3}Co_{1/3}O_2$ (NMC, lithium nickel manganese cobalt oxide) positive electrode material as a positive electrode, lithium metal as a negative electrode, and the multi-layer structured composite electrolyte of Example 1 as an electrolyte.

A secondary battery of Comparative Example 1 was prepared using a $LiNi_{1/3}Mn_{1/3}Co_{1/3}O_2$ (NMC, lithium nickel manganese cobalt oxide) positive electrode material as a positive electrode, lithium metal as a negative electrode, and a single layer of the first composite electrolyte layer of Example 1 as an electrolyte.

Figure 7:
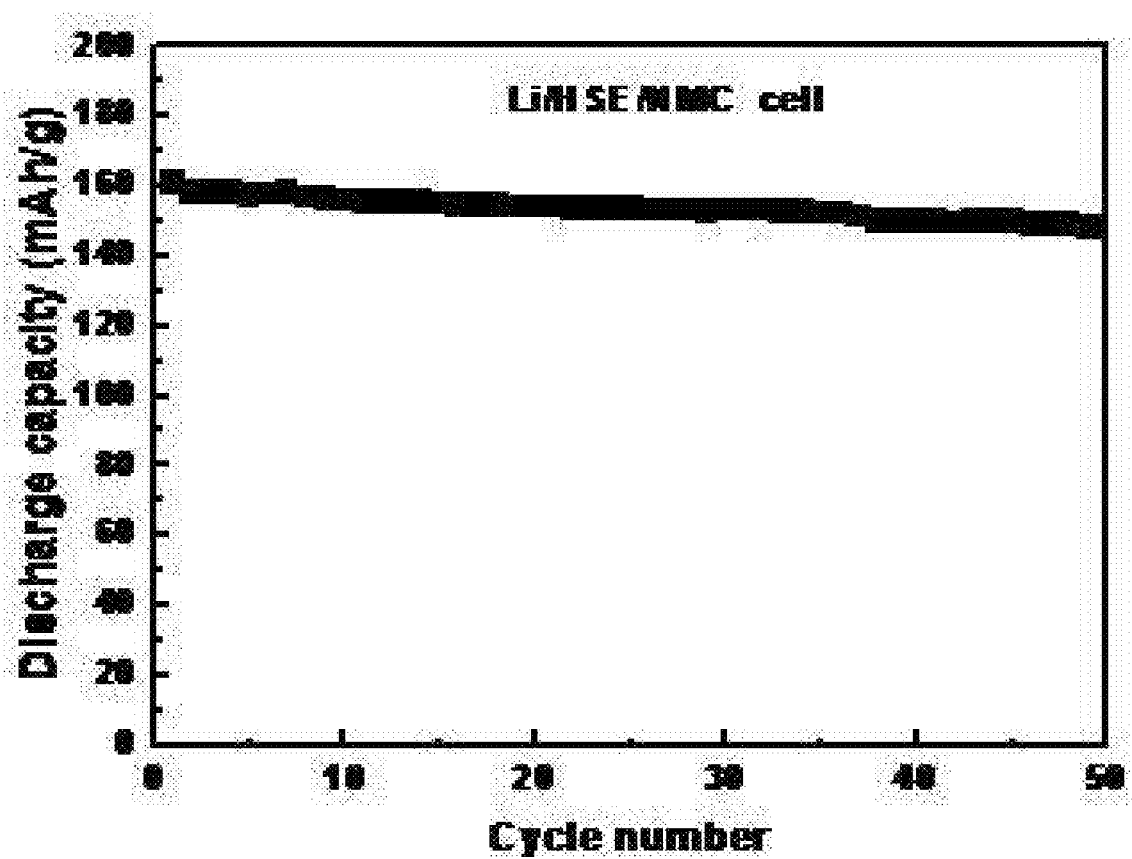
FIG. 7 is a graph showing a discharge capacity according to a cycle number of a secondary battery of Example 2.
Figure 8:
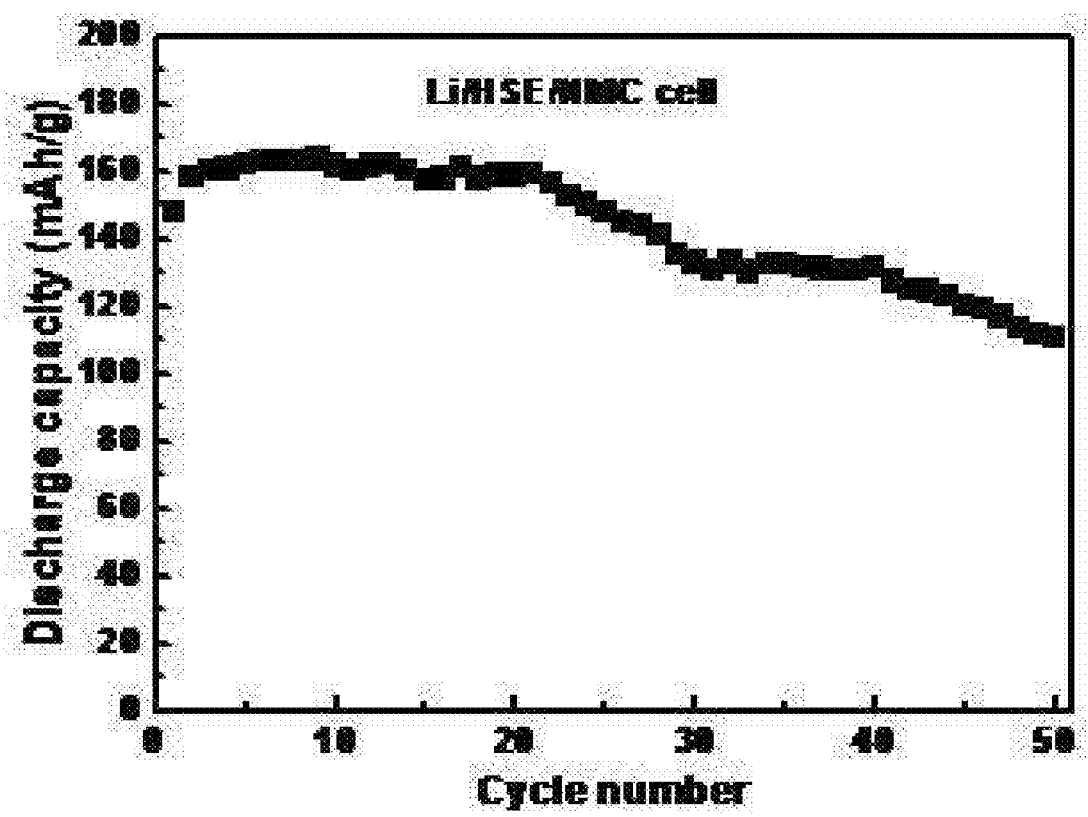
FIG. 8 is a graph showing a discharge capacity according to a cycle number of a secondary battery of Comparative Example 1.

Charge and discharge tests were performed at a charge voltage of 4.4 V, a discharge voltage of 3.0 V and 0.1 C for the two secondary batteries. The discharge capacity according to the cycle number of the secondary battery of Example 2 was shown in FIG. 7, and the discharge capacity according to the cycle number of the secondary battery of Comparative Example 1 was shown in FIG. 8. The secondary battery of Example 2 has a discharge capacity of about 150 mAh/g even after 50 cycles, which is almost the same as an initial discharge capacity. However, in the secondary battery of Comparative Example 1, the discharge capacity after about 50 cycles is about 110 mAh/g, which is much lower than the initial discharge capacity.

Figure 9:
FIG. 9 is a photograph showing a state of a first composite electrolyte layer of the secondary battery of Example 2 after 50 cycles.
Figure 10:
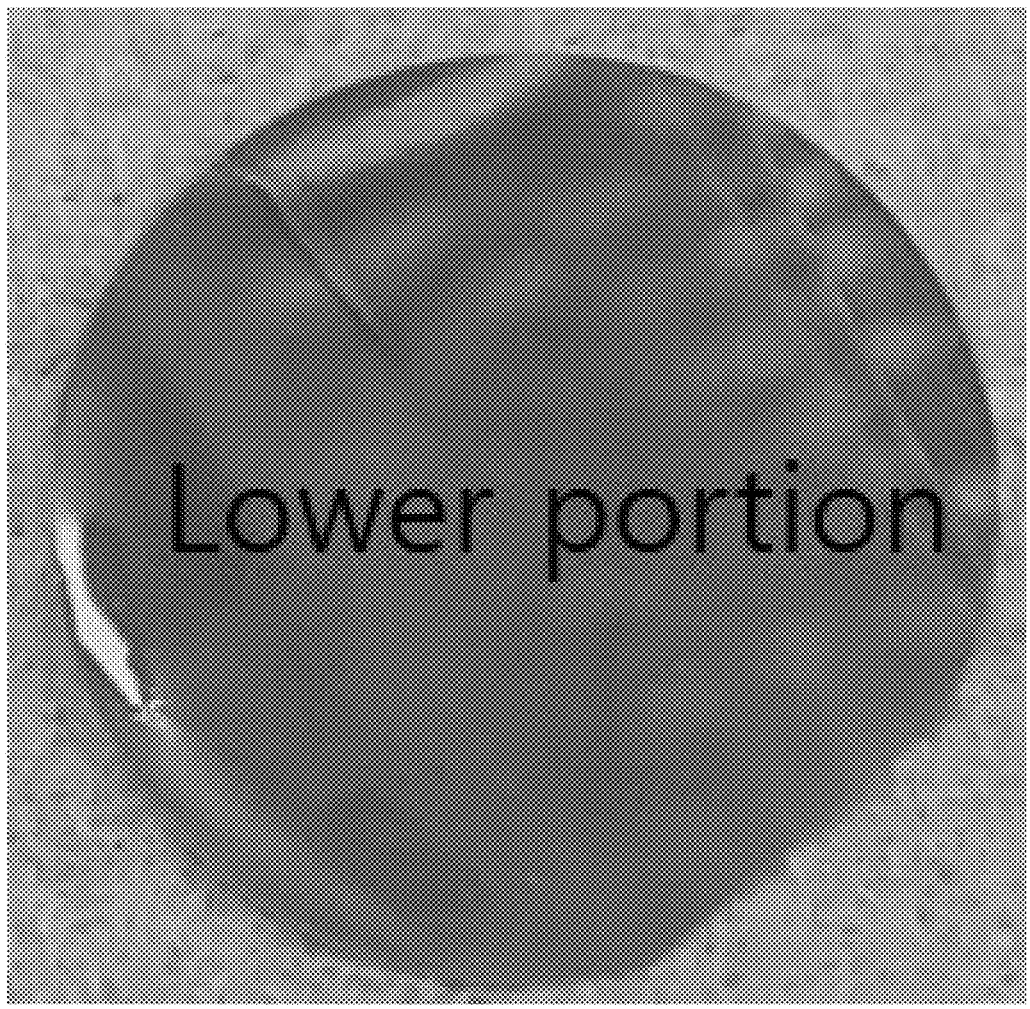
FIG. 10 is a photograph showing a state of a second composite electrolyte layer of the secondary battery of Example 2 after 50 cycles.
Figure 11:
FIG. 11 is a photograph showing a state of a single-layered composite electrolyte layer of the secondary battery of Comparative Example 1 after 50 cycles.

FIG. 9 shows a state of a first composite electrolyte layer of the secondary battery of Example 2 after 50 cycles. FIG. 10 shows a state of a second composite electrolyte layer of the secondary battery of Example 2 after 50 cycles. FIG. 11 shows a state of a single-layered composite electrolyte layer of the secondary battery of Comparative Example 1 after 50 cycles. As shown in FIGS. 9 and 10, the first composite electrolyte layer and the second composite electrolyte layer of the secondary battery of Example 2 have no change on the surface even after 50 cycles of charge and discharge. However, as shown in FIG. 11, there was a reaction in the single-layered composite electrolyte layer (LTAP) of Comparative Example 1 after 50 cycles of charge and discharge, and then the surface became black. Since the LTAP ceramic electrolyte contains Ti, a reduction reaction occurs at 1.5V. Therefore, the reaction occurs earlier in the ceramic electrolyte than in the negative electrode, and then the surface becomes black and the life characteristics are deteriorated. However, the LTAP ceramic electrolyte is suitable as a positive electrode electrolyte due to excellent ionic conductivity thereof.

Through the Examples, it can be seen that it is preferable not to use a ceramic containing Ti, Si, S, and Ge in the composite electrolyte layer of the negative electrode when lithium metal is used as the negative electrode.

Example 3

Example 3 compares the ionic conductivity and interfacial resistance when different electrolytes are used. The multi-layer structured composite electrolyte (Example 3) prepared in Example 1 was compared with the multi-layer structured composite electrolyte prepared in Example 1 without the liquid electrolyte (Comparative Example 2) and the liquid electrolyte used in Example 1 (Comparative Example 3).

Figure 12:
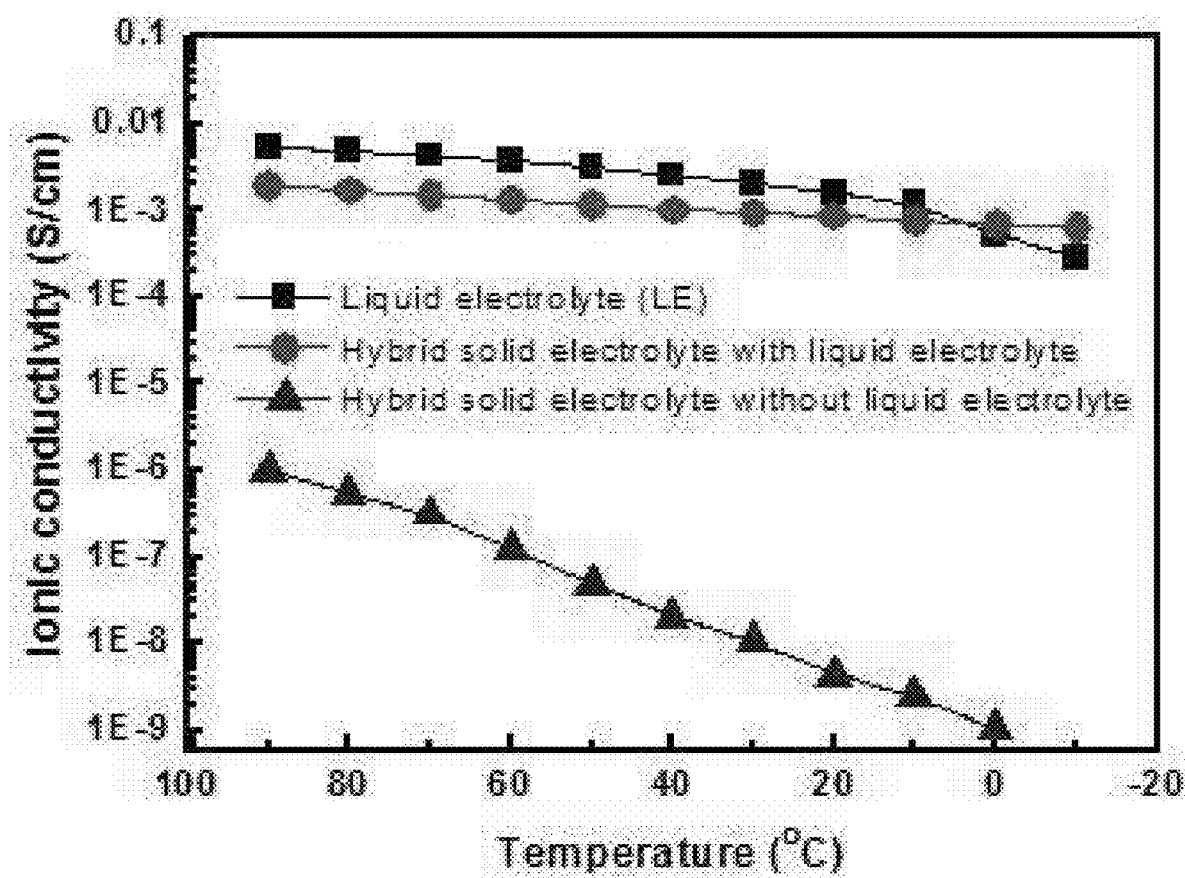
FIG. 12 is a graph showing ionic conductivity at room temperature of electrolytes of Example 3, Comparative Example 2 and Comparative Example 3.
Figure 13:
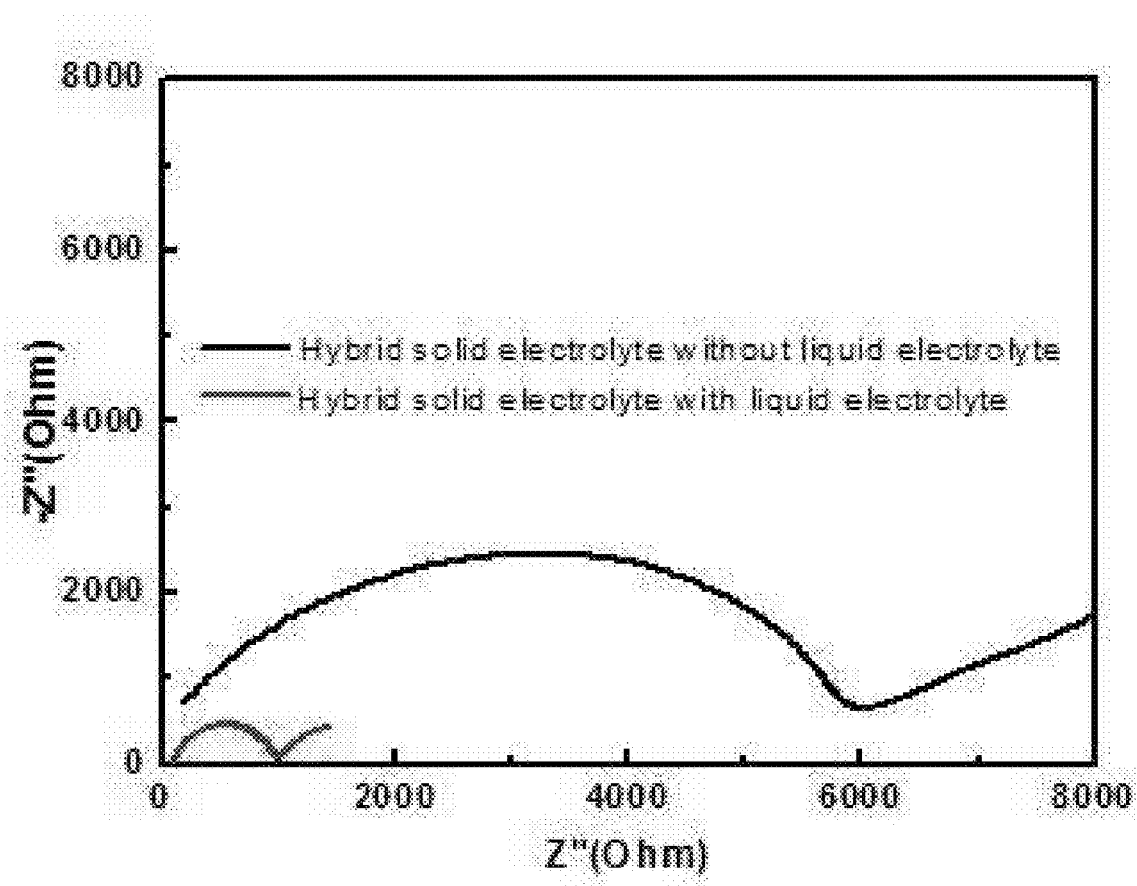
FIG. 13 is a graph showing interfacial resistance of electrolytes of Example 3 and Comparative Example 2.

FIG. 12 showed ionic conductivity at room temperature of electrolytes of Example 3, Comparative Example 2 and Comparative Example 3. FIG. 13 showed interfacial resistances of electrolytes of Example 3, Comparative Example 2 and Comparative Example 3. As shown in FIG. 12, the liquid electrolyte of Comparative Example 3 has an ionic conductivity of $2.1 \times 10^{-3}$ S/cm at room temperature. The multi-layer structured composite electrolyte of Example 3 has an ionic conductivity of $7.9 \times 10^{-4}$ S/cm at room temperature. The electrolyte of Comparative Example 2 (the multi-layer structured composite electrolyte without the liquid electrolyte) has an ionic conductivity of $1.1 \times 10^{-8}$ S/cm at room temperature. It can be seen that the composite electrolyte with the liquid electrolyte exhibits an ionic conductivity almost equal to that of the liquid electrolyte. However, it can be seen that the composite electrolyte without the liquid electrolyte has a significantly lower ionic conductivity than the composite electrolyte with the liquid electrolyte.

FIG. 13 showed interfacial resistances of electrolytes of Example 3 and Comparative Example 2. As shown in FIG. 13, the composite electrolyte without the liquid electrolyte (Comparative Example 2) shows an interface resistance of 6,000Ω, and the composite electrolyte with the liquid electrolyte (Example 3) shows an interface resistance of 1,000Ω or less. From this, it can be seen that the liquid electrolyte included in the composite electrolyte of the ceramic material and the polymer may significantly reduce the interfacial resistance.

Example 4

A first composite electrolyte layer used LTAP as a ceramic material, PVdF as a polymer, and 1M $LiPF_6$ in EC/DMC (ethyl carbonate/dimethylcarbonate, 1:1 vol) as a liquid electrolyte, and a second composite electrolyte layer used β-$Al_2O_3$ as a ceramic material, PVdF-TrFE as a polymer, and 1M $LiPF_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

Figure 14:
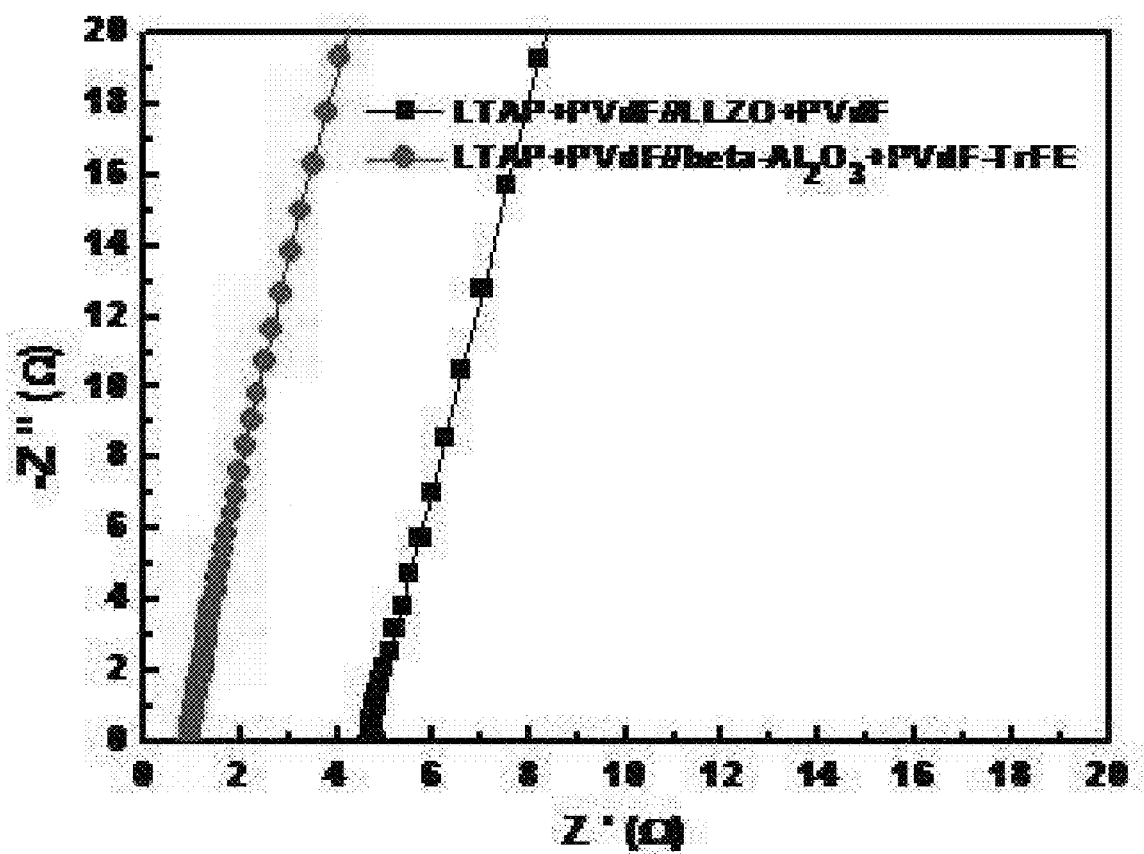
FIG. 14 is a graph showing the ionic conductivities of the secondary battery of Example 4 and the secondary battery of Example 2.
Figure 15:
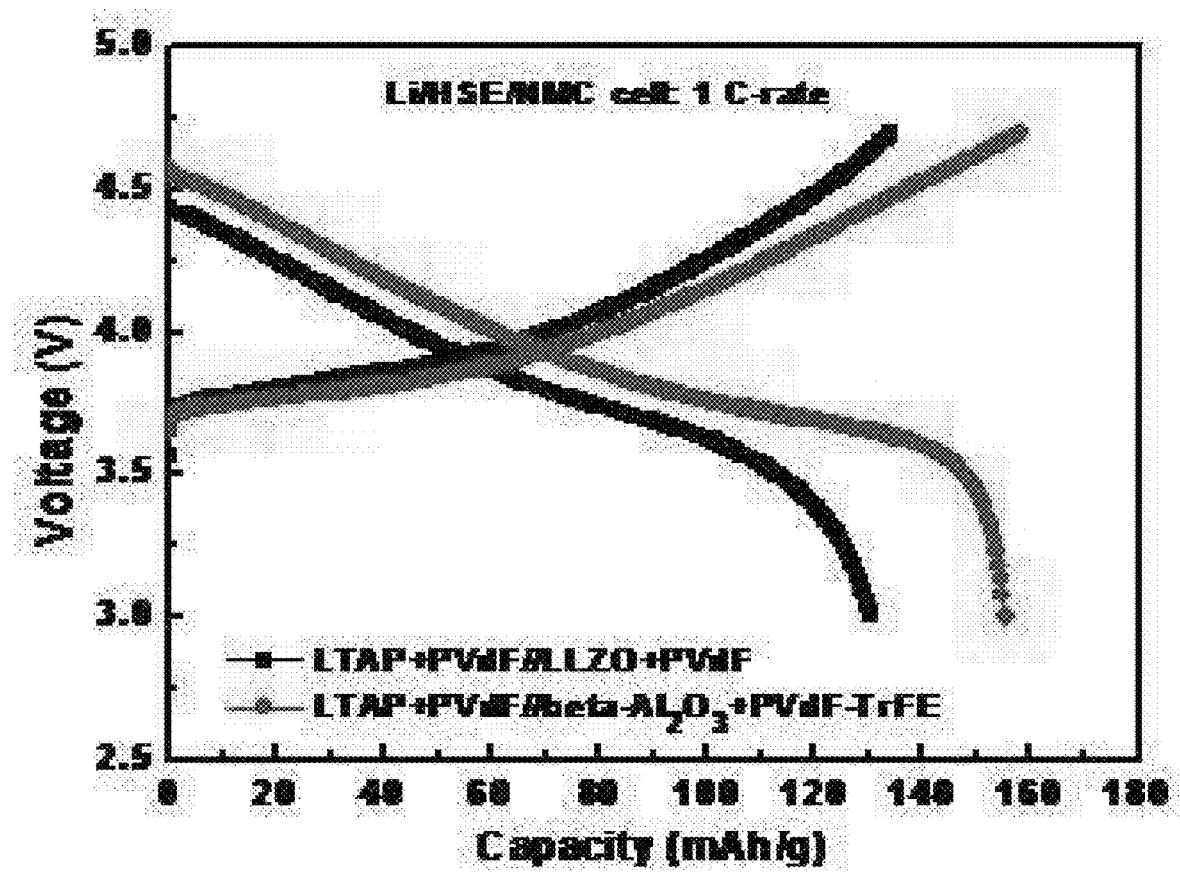
FIG. 15 is a graph showing the results of charge and discharge tests for the secondary battery of Example 4 and the secondary battery of Example 2.

A secondary battery of Example 4 was prepared using a $LiNi_{1/3}Mn_{1/3}Co_{1/3}O_2$ (NMC, lithium nickel manganese cobalt oxide) positive electrode material as a positive electrode, lithium metal as a negative electrode, and the multi-layer structured composite electrolyte of Example 4 as an electrolyte. The ionic conductivities of the secondary battery of Example 4 and the secondary battery of Example 2 were shown in FIG. 14. Charge and discharge tests were performed at a charge voltage of 4.7V, a discharge voltage of 3.0 V and 1 C for the two secondary batteries. The results were shown in FIG. 15. The ion conductivity and the discharge capacity of the two secondary batteries are compared and shown in Table 1 below.

TABLE 1

| Battery | Ionic conductivity | Discharge capacity |
|---------|-------------------|-------------------|
| Example 2 | $7.9 \times 10^{-4}$ S/cm | 130.5 mAh/g |
| Example 4 | $2.1 \times 10^{-3}$ S/cm | 155.4 mAh/g |

The secondary battery of Example 2 exhibits an ionic conductivity and a discharge capacity almost equal to that of the liquid electrolyte. In the secondary battery of Example 4, β-$Al_2O_3$ used as the ceramic material of the second composite electrolyte layer has better lithium ionic conductivity than LLZO used as the ceramic material of the second composite electrolyte layer of the secondary battery of Example 2 and the PVdF-TrFE used as the polymer improves the movement of lithium ions because it is a better ferroelectric polymer compared with the PVdF used in the secondary battery of Example 2. Therefore, in the secondary battery of Example 4, the ion conductivity and the discharge capacity are better than those of the secondary battery of Example 2.

Example 5

A first composite electrolyte layer used LTAP as a ceramic material, PVdF as a polymer, and 1M $LiPF_6$ in EC/DMC (ethyl carbonate/dimethylcarbonate, 1:1 vol) as a liquid electrolyte, and a second composite electrolyte layer used LLZO as a ceramic material, PVdF-TrFE as a polymer, and 1M $LiPF_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 5 was prepared using a $LiNi_{1/3}Mn_{1/3}Co_{1/3}O_2$ (NMC, lithium nickel manganese cobalt oxide) positive electrode material as a positive electrode, lithium metal as a negative electrode, and the multi-layer structured composite electrolyte of Example 5 as an electrolyte.

Example 6

A first composite electrolyte layer used LLTO as a ceramic material, PVdF as a polymer, and 1M $LiPF_6$ in EC/DMC (ethyl carbonate/dimethylcarbonate, 1:1 vol) as a liquid electrolyte, and a second composite electrolyte layer used β-$Al_2O_3$ as a ceramic material, PVdF-TrFE as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 6 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 6 as an electrolyte.

Example 7

A first composite electrolyte layer used Li$_2$S—P$_2$S$_5$ as a ceramic material, PVdF as a polymer, and 1M LiPF$_6$ in EC/DMC (ethyl carbonate/dimethylcarbonate, 1:1 vol) as a liquid electrolyte, and a second composite electrolyte layer used β-Al$_2$O$_3$ as a ceramic material, PVdF-TrFE as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 7 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 7 as an electrolyte.

Figure 16:
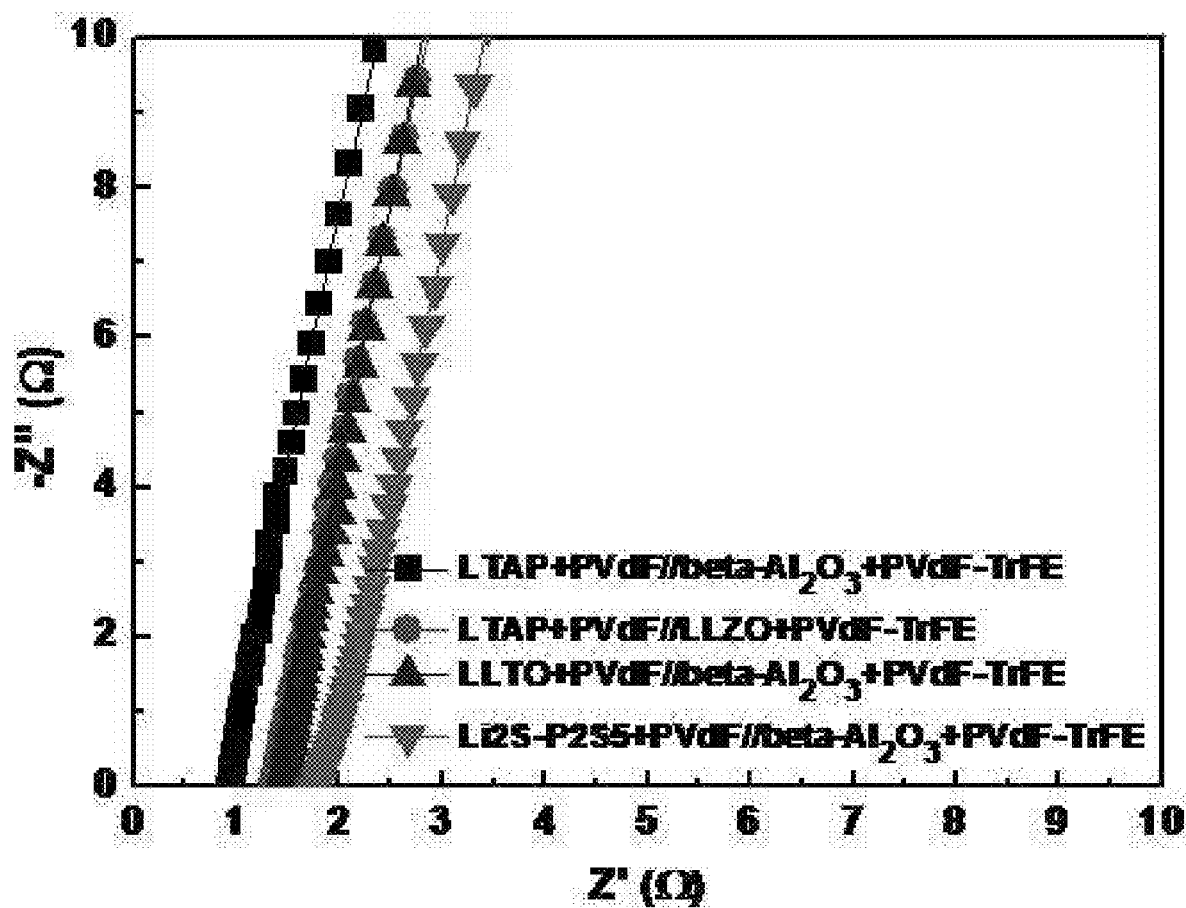
FIG. 16 is a graph showing the ionic conductivities of the secondary batteries of Examples 4 to 7.
Figure 17:
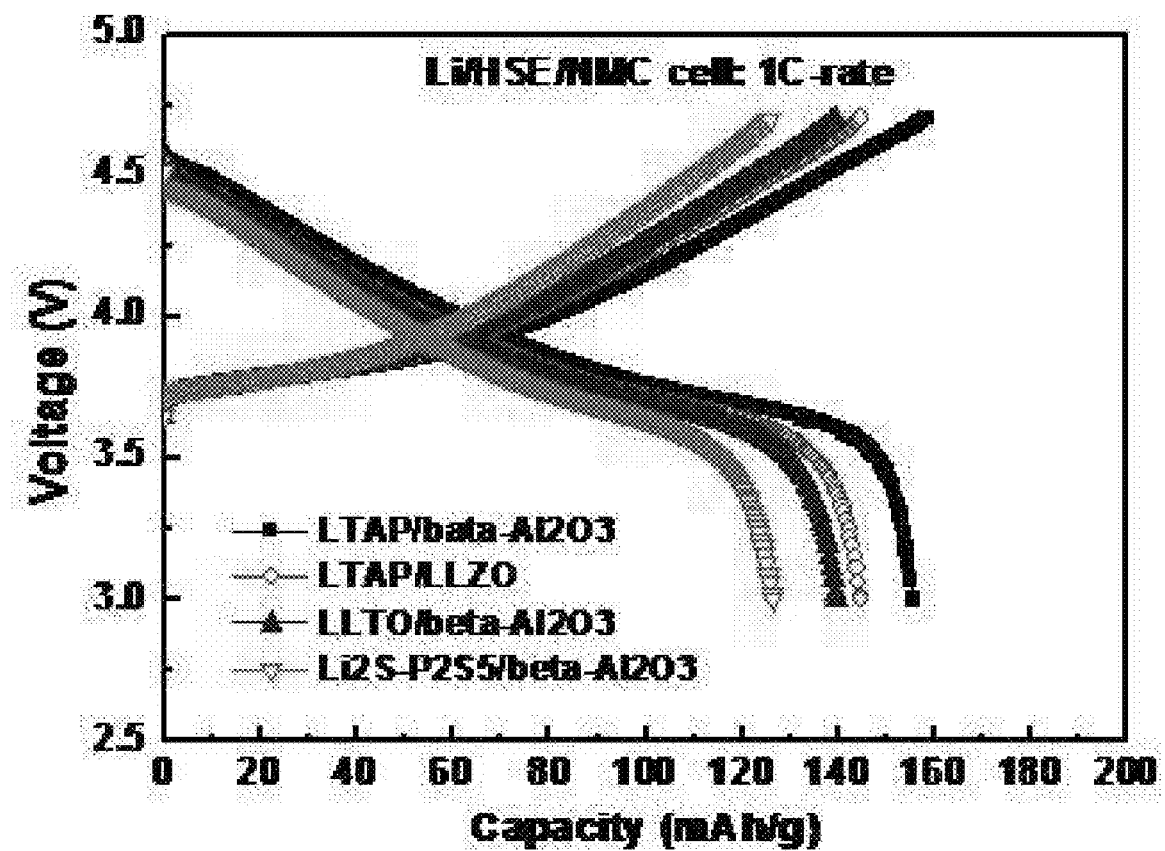
FIG. 17 is a graph showing the results of charge and discharge tests for the secondary batteries of Examples 4 to 7.

Ionic conductivities of the secondary batteries of Examples 4 to 7 were shown in FIG. 16. Charge and discharge tests were performed at a charge voltage of 4.7 V, a discharge voltage of 3.0 V and 1 C for the four secondary batteries. The results were shown in FIG. 17. The ionic conductivities and discharge capacities of Examples 4 to 7 are compared and shown in Table 2 below.

TABLE 2

| Battery | Ionic conductivity | Discharge capacity |
|---|---|---|
| Example 4 | 2.1 × 10$^{-3}$ S/cm | 155.4 mAh/g |
| Example 5 | 1.2 × 10$^{-3}$ S/cm | 144.6 mAh/g |
| Example 6 | 1.1 × 10$^{-3}$ S/cm | 139.5 mAh/g |
| Example 7 | 8.1 × 10$^{-4}$ S/cm | 126.4 mAh/g |

The secondary batteries of Examples 4 to 7 all exhibit ionic conductivities and discharge capacities almost equal to those of the liquid electrolyte.

Example 8

A first composite electrolyte layer used LTAP as a ceramic material, PVdF as a polymer, and 1M LiPF$_6$ in EC/DMC (ethyl carbonate/dimethylcarbonate, 1:1 vol) as a liquid electrolyte, and a second composite electrolyte layer used LAGP as a ceramic material, PVdF as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 8 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 8 as an electrolyte.

Example 9

A first composite electrolyte layer used LLZO as a ceramic material, PVdF as a polymer, and 1M LiPF$_6$ in EC/DMC (ethyl carbonate/dimethylcarbonate, 1:1 vol) as a liquid electrolyte, and a second composite electrolyte layer used LAGP as a ceramic material, PVdF as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 9 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 9 as an electrolyte.

Example 10

A first composite electrolyte layer used Li$_2$S—P$_2$S$_5$ as a ceramic material, PVdF as a polymer, and 1M LiPF$_6$ in EC/DMC (ethyl carbonate/dimethylcarbonate, 1:1 vol) as a liquid electrolyte, and a second composite electrolyte layer used LAGP as a ceramic material, PVdF as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 10 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 10 as an electrolyte.

Figure 18:
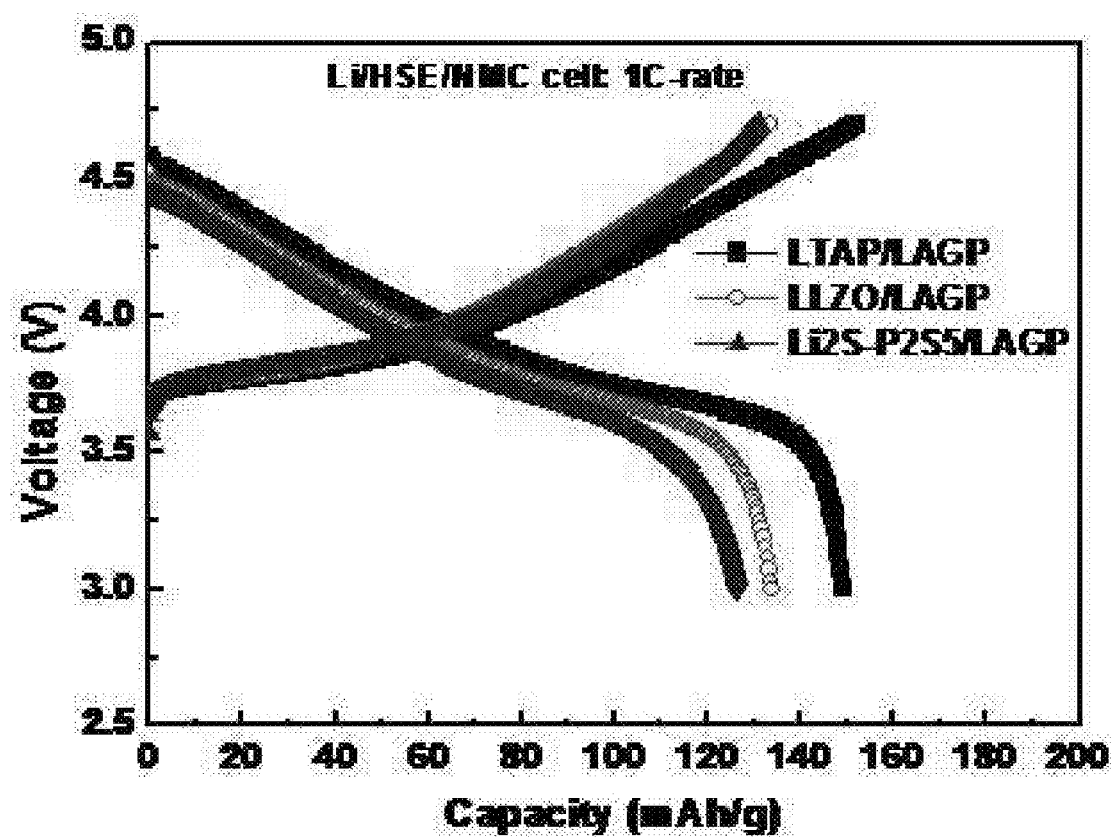
FIG. 18 is a graph showing the results of charge and discharge tests for the secondary batteries of Examples 8 to 10.

Ionic conductivities of the secondary batteries of Examples 8 to 10 were shown in Table 3 below. Charge and discharge tests were performed at a charge voltage of 4.7 V, a discharge voltage of 3.0 V and 1 C for the three secondary batteries. The results were shown in FIG. 18. The ionic conductivities and discharge capacities of Examples 8 to 10 are compared and shown in Table 3 below.

TABLE 3

| Battery | Ionic conductivity | Discharge capacity |
|---|---|---|
| Example 8 | 1.9 × 10$^{-3}$ S/cm | 149.2 mAh/g |
| Example 9 | 1.0 × 10$^{-3}$ S/cm | 133.9 mAh/g |
| Example 10 | 7.5 × 10$^{-4}$ S/cm | 126.4 mAh/g |

The secondary batteries of Examples 8 to 10 all exhibit ionic conductivities and discharge capacities almost equal to those of the liquid electrolyte.

Example 11

A first composite electrolyte layer used LTAP as a ceramic material, PAN as a polymer, and 1M LiPF$_6$ in EC/DMC (ethyl carbonate/dimethylcarbonate, 1:1 vol) as a liquid electrolyte, and a second composite electrolyte layer used LGPS as a ceramic material, PAN as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 11 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 11 as an electrolyte.

Example 12

A first composite electrolyte layer used LLZO as a ceramic material, PAN as a polymer, and 1M LiPF$_6$ in EC/DMC (ethyl carbonate/dimethylcarbonate, 1:1 vol) as a liquid electrolyte, and a second composite electrolyte layer used Li$_2$O—SiO$_2$ as a ceramic material, PAN as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 12 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 12 as an electrolyte.

Example 13

A first composite electrolyte layer used Li$_2$S—P$_2$S$_5$ as a ceramic material, PAN as a polymer, and 1M LiPF$_6$ in EC/DMC (ethyl carbonate/dimethylcarbonate, 1:1 vol) as a liquid electrolyte, and a second composite electrolyte layer used LGPS as a ceramic material, PAN as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 13 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 13 as an electrolyte.

Example 14

A first composite electrolyte layer used LTAP as a ceramic material, PAN as a polymer, and 1M LiPF$_6$ in EC/DMC (ethyl carbonate/dimethylcarbonate, 1:1 vol) as a liquid electrolyte, and a second composite electrolyte layer used Li$_2$O—SiO$_2$ as a ceramic material, PAN as a polymer, and 1M LiPF$_6$ in EC/DMC (ethyl carbonate/dimethylcarbonate, 1:1 vol) as a liquid electrolyte. The first composite electrolyte layer (upper layer) and the second composite electrolyte layer (lower layer) were laminated to form a multi-layer structured composite electrolyte layer.

A secondary battery of Example 14 was prepared using a LiNi$_{1/3}$Mn$_{1/3}$Co$_{1/3}$O$_2$ (NMC, lithium nickel manganese cobalt oxide) positive electrode material as a positive electrode, lithium metal as a negative electrode, and the multi-layer structured composite electrolyte of Example 14 as an electrolyte.

Figure 19:
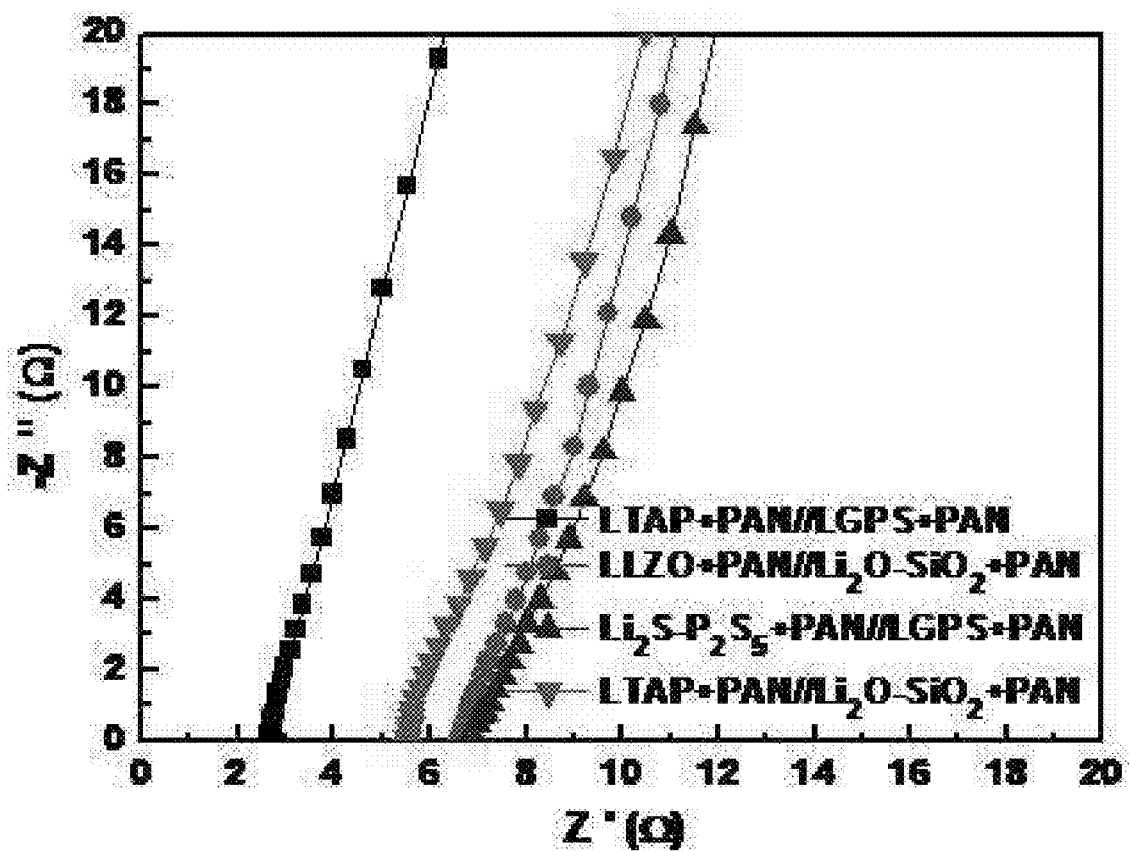
FIG. 19 is a graph showing the ionic conductivities of the secondary batteries of Examples 11 to 14.
Figure 20:
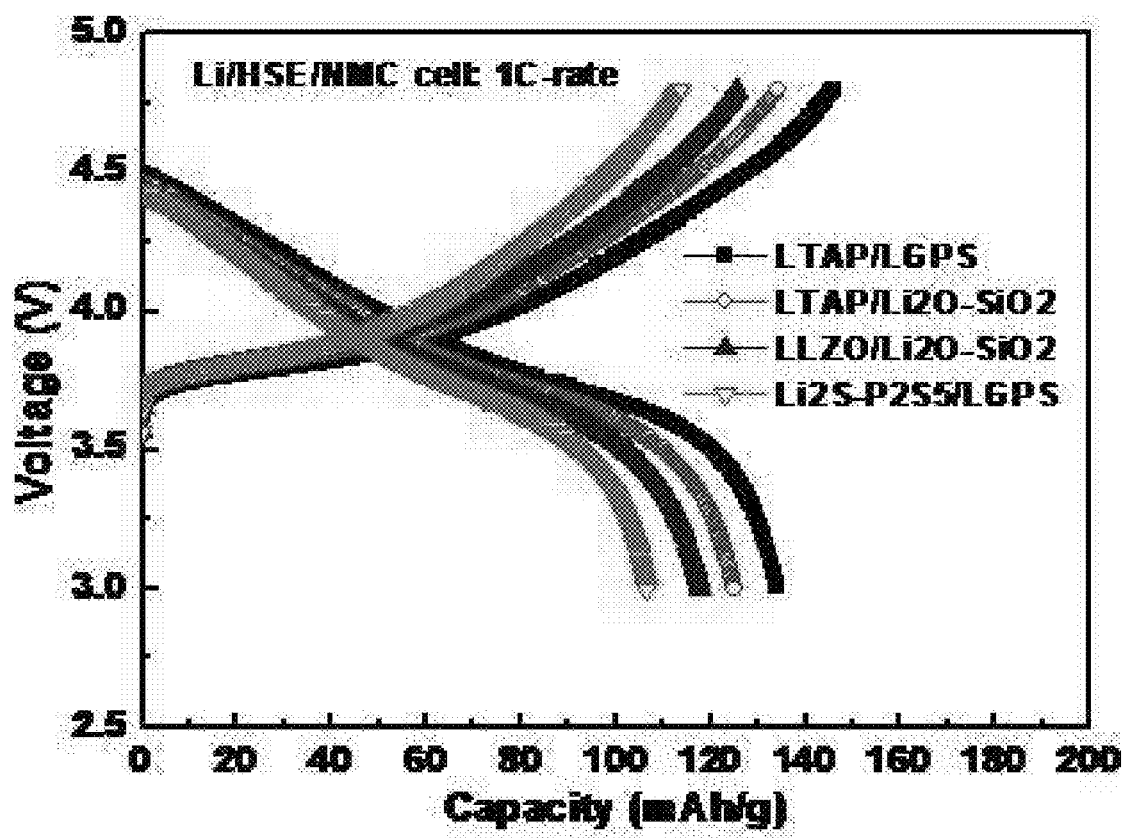
FIG. 20 is a graph showing the results of charge and discharge tests for the secondary batteries of Examples 11 to 14.

Ionic conductivities of the secondary batteries of Examples 11 to 14 were shown in FIG. 19. Charge and discharge tests were performed at a charge voltage of 4.7 V, a discharge voltage of 3.0 V and 1 C for the four secondary batteries. The results were shown in FIG. 20. The ionic conductivities and discharge capacities of Examples 11 to 14 are compared and shown in Table 4 below.

TABLE 4

| Battery | Ionic conductivity | Discharge capacity |
| --- | --- | --- |
| Example 11 | 9.3 × 10$^{-4}$ S/cm | 134.1 mAh/g |
| Example 12 | 5.6 × 10$^{-4}$ S/cm | 117.9 mAh/g |
| Example 13 | 4.2 × 10$^{-4}$ S/cm | 106.5 mAh/g |
| Example 14 | 7.3 × 10$^{-4}$ S/cm | 125.2 mAh/g |

The secondary batteries of Examples 11 to 14 all exhibit ionic conductivities and discharge capacities almost equal to those of the liquid electrolyte.

The invention claimed is:

1. A multi-layer structured composite electrolyte for a lithium ion secondary battery comprising:
    a first composite electrolyte layer located toward a positive electrode; and
    a second composite electrolyte layer located toward a negative electrode,
    wherein the first composite electrolyte layer and the second composite electrolyte layer include a polymer, an ion conductive ceramic material, and a liquid electrolyte,
    the ion conductive ceramic material of the first composite electrolyte layer is 70 wt % to 99 wt % and the polymer of the first composite electrolyte layer is 1 wt % to 30 wt % when the ion conductive ceramic material of the first composite electrolyte layer and the polymer of the first composite electrolyte layer are 100 wt %,
    the ion conductive ceramic material of the second composite electrolyte layer is 70 wt % to 99 wt % and the polymer of the second composite electrolyte layer is 1 wt % to 30 wt % when the ion conductive ceramic material of the second composite electrolyte layer and the polymer of the second composite electrolyte layer are 100 wt %,
    the liquid electrolyte is formed by dissolving a lithium salt in a non-aqueous organic solvent,
    the liquid electrolyte of the first composite electrolyte layer is contained with 5 parts by weight to 40 parts by weight with respect to 100 parts by weight of the ion conductive ceramic material of the first composite electrolyte layer and the polymer of the first composite electrolyte layer,
    the liquid electrolyte of the second composite electrolyte layer is contained with 5 parts by weight to 40 parts by weight with respect to 100 parts by weight of the ion conductive ceramic material of the second composite electrolyte layer and the polymer of the second composite electrolyte layer,
    the polymer of the first composite electrolyte layer is polyvinylidene fluoride (PVdF) or copolymers thereof, and the ion conductive ceramic material of the first composite electrolyte layer is a ceramic material selected from phosphates, oxides, sulfides, and mixtures thereof, and the polymer of the second composite electrolyte layer is polyvinylidene fluoride (PVdF) or copolymers thereof, and the ion conductive ceramic material of the second composite electrolyte layer is a phosphate ceramic material.

2. A multi-layer structured composite electrolyte for a lithium ion secondary battery comprising:
a first composite electrolyte layer located toward a positive electrode; and
a second composite electrolyte layer located toward a negative electrode,
wherein the first composite electrolyte layer and the second composite electrolyte layer include a polymer, an ion conductive ceramic material, and a liquid electrolyte,
the ion conductive ceramic material of the first composite electrolyte layer is 70 wt % to 99 wt % and the polymer of the first composite electrolyte layer is 1 wt % to 30 wt % when the ion conductive ceramic material of the first composite electrolyte layer and the polymer of the first composite electrolyte layer are 100 wt %,
the ion conductive ceramic material of the second composite electrolyte layer is 70 wt % to 99 wt % and the polymer of the second composite electrolyte layer is 1 wt % to 30 wt % when the ion conductive ceramic material of the second composite electrolyte layer and the polymer of the second composite electrolyte layer are 100 wt %,
the liquid electrolyte is formed by dissolving a lithium salt in a non-aqueous organic solvent,
the liquid electrolyte of the first composite electrolyte layer is contained with 5 parts by weight to 40 parts by weight with respect to 100 parts by weight of the ion conductive ceramic material of the first composite electrolyte layer and the polymer of the first composite electrolyte layer,
the liquid electrolyte of the second composite electrolyte layer is contained with 5 parts by weight to 40 parts by weight with respect to 100 parts by weight of the ion conductive ceramic material of the second composite electrolyte layer and the polymer of the second composite electrolyte layer,
the polymer of the first composite electrolyte layer is polyvinylidene fluoride (PVdF) or copolymers thereof, and the ion conductive ceramic material of the first composite electrolyte layer is a ceramic material selected from phosphates, oxides, sulfides, and mixtures thereof, and
the polymer of the second composite electrolyte layer is polyvinylidene fluoride (PVdF) or a copolymer thereof, and the ion conductive ceramic material of the second composite electrolyte layer is an oxide ceramic material.

3. A multi-layer structured composite electrolyte for a lithium ion secondary battery comprising:
a first composite electrolyte layer located toward a positive electrode; and
a second composite electrolyte layer located toward a negative electrode,
wherein the first composite electrolyte layer and the second composite electrolyte layer include a polymer, an ion conductive ceramic material, and a liquid electrolyte,
the ion conductive ceramic material of the first composite electrolyte layer is 70 wt % to 99 wt % and the polymer of the first composite electrolyte layer is 1 wt % to 30 wt % when the ion conductive ceramic material of the first composite electrolyte layer and the polymer of the first composite electrolyte layer are 100 wt %,
the ion conductive ceramic material of the second composite electrolyte layer is 70 wt % to 99 wt % and the polymer of the second composite electrolyte layer is 1 wt % to 30 wt % when the ion conductive ceramic material of the second composite electrolyte layer and the polymer of the second composite electrolyte layer are 100 wt %,
the liquid electrolyte is formed by dissolving a lithium salt in a non-aqueous organic solvent,
the liquid electrolyte of the first composite electrolyte layer is contained with 5 parts by weight to 40 parts by weight with respect to 100 parts by weight of the ion conductive ceramic material of the first composite electrolyte layer and the polymer of the first composite electrolyte layer,
the liquid electrolyte of the second composite electrolyte layer is contained with 5 parts by weight to 40 parts by weight with respect to 100 parts by weight of the ion conductive ceramic material of the second composite electrolyte layer and the polymer of the second composite electrolyte layer,
the polymer of the first composite electrolyte layer is polyacrylonitrile (PAN) or copolymers thereof, and the ion conductive ceramic material of the first composite electrolyte layer is a ceramic material selected from phosphates, oxides, sulfides, and mixtures thereof, and
the polymer of the second composite electrolyte layer is polyacrylonitrile (PAN) or copolymers thereof, and the ion conductive ceramic material of the second conductive electrolyte layer is a sulfide ceramic material.

4. The multi-layer structured composite electrolyte of claim 1, wherein the ion conductive ceramic material of the first composite electrolyte layer is selected from LTAP $(Li_{1+x}Ti_{2-x}Al_x(PO_4)_3)$ $(0<x<2)$, LLZO $(Li_7La_3Zr_2O_{12})$, $Li_2S$—$P_2S_5$, and mixtures thereof, and
the ion conductive ceramic material of the second composite electrolyte layer is LAGP $(Li_{1+x}Al_xGe_{2-x}(PO_4)_3)$ $(0<x<2)$.

5. The multi-layer structured composite electrolyte of claim 2, wherein
the ion conductive ceramic material of the first composite electrolyte layer is selected from LTAP $(Li_{1+x}Ti_{2-x}Al_x(PO_4)_3)$ $(0<x<2)$, LLTO $(La,Li)TiO_3)$, $Li_2S$—$P_2S_5$), and mixtures thereof, and
the ion conductive ceramic material of the second composite electrolyte layer is selected from β-$Al_2O_3$, LLZO $(Li_7La_3Zr_2O_{12})$, and mixtures thereof.

6. The multi-layer structured composite electrolyte of claim 3, wherein the ion conductive ceramic material of the first composite electrolyte layer is selected from LTAP $(Li_{1+x}Ti_{2-x}Al_x(PO_4)_3)$ $(0<x<2)$, LLZO $(Li_7La_3Zr_2O_{12})$, $Li_2S$—$P_2S_5$, and mixtures thereof, and
the ion conductive ceramic material of the second composite electrolyte layer is selected from LGPS $(Li_{3.25}Ge_{0.25}P_{0.75}S_4)$, $Li_2O$—$SiO_2$, and mixtures thereof.

7. The multi-layer structured composite electrolyte of claim 1, wherein the polymer of the first composite electrolyte layer is polyvinylidene fluoride (PVdF) and the ion conductive ceramic material thereof is LTAP $(Li_{1+x}Ti_{2-x}Al_x(PO_4)_3)$ $(0<x<2)$, and the polymer of the second composite electrolyte layer is polyvinylidene fluoride (PVdF) and the ion conductive ceramic material thereof is LAGP $(Li_{1+x}Al_xGe_{2-x}(PO_4)_3)$ $(0<x<2)$.

8. The multi-layer structured composite electrolyte of claim 1, wherein the polymer of the first composite electrolyte layer is polyvinylidene fluoride (PVdF) and the ion conductive ceramic material thereof is LLZO ($Li_7La_3Zr_2O_{12}$), and the polymer of the second composite electrolyte layer is polyvinylidene fluoride (PVdF) and the ion conductive ceramic material thereof is LAGP ($Li_{1+x}Al_xGe_{2-x}(PO_4)_3$) (0<x<2).

9. The multi-layer structured composite electrolyte of claim 1, wherein the polymer of the first composite electrolyte layer is polyvinylidene fluoride (PVdF) and the ion conductive ceramic material thereof is $Li_2S$—$P_2S_5$, and the polymer of the second composite electrolyte layer is polyvinylidene fluoride (PVdF) and the ion conductive ceramic material thereof is LAGP ($Li_{1+x}Al_xGe_{2-x}(PO_4)_3$) (0<x<2).

10. The multi-layer structured composite electrolyte of claim 2, wherein
the polymer of the first composite electrolyte layer is PVdF and the ion conductive ceramic material thereof is LTAP ($Li_{1+x}Ti_{2-x}Al_x(PO_4)_3$) (0<x<2), and the polymer of the second composite electrolyte layer is PVdF-TrFE and the ion conductive ceramic material thereof is β-$Al_2O_3$.

11. The multi-layer structured composite electrolyte of claim 2, wherein the polymer of the first composite electrolyte layer is PVdF and the ion conductive ceramic material thereof is LTAP ($Li_{1+x}Ti_{2-x}Al_x(PO_4)_3$) (0<x<2), and the polymer of the second composite electrolyte layer is PVdF-TrFE and the ion conductive ceramic material thereof is LLZO ($Li_7La_3Zr_2O_{12}$).

12. The multi-layer structured composite electrolyte of claim 2, wherein the polymer of the first composite electrolyte layer is PVdF and the ion conductive ceramic material thereof is LLTO ((La,Li)$TiO_3$), and the polymer of the second composite electrolyte layer is PVdF-TrFE and the ion conductive ceramic material thereof is β-$Al_2O_3$.

13. The multi-layer structured composite electrolyte of claim 2, wherein the polymer of the first composite electrolyte layer is PVdF and the ion conductive ceramic material thereof is $Li_2S$—$P_2S_5$, and the polymer of the second composite electrolyte layer is PVdF-TrFE and the ion conductive ceramic material thereof is β-$Al_2O_3$.

14. The multi-layer structured composite electrolyte of claim 2, wherein the polymer of the first composite electrolyte layer is PVdF and the ion conductive ceramic material thereof is LTAP ($Li_{1+x}Ti_{2-x}Al_x(PO_4)_3$) (0<x<2), and the polymer of the second composite electrolyte layer is PVdF and the ion conductive ceramic material thereof is LLZO ($Li_7La_3Zr_2O_{12}$).

15. The multi-layer structured composite electrolyte of claim 3, wherein the polymer of the first composite electrolyte layer is polyacrylonitrile (PAN) and the ion conductive ceramic material thereof is LTAP ($Li_{1+x}Ti_{2-x}Al_x(PO_4)_3$) (0<x<2), and the polymer of the second composite electrolyte layer is polyacrylonitrile (PAN) and the ion conductive ceramic material thereof is LGPS ($Li_{3.25}Ge_{0.25}P_{0.75}S_4$).

16. The multi-layer structured composite electrolyte of claim 3, wherein the polymer of the first composite electrolyte layer is polyacrylonitrile (PAN) and the ion conductive ceramic material thereof is LLZO ($Li_7La_3Zr_2O_{12}$), and the polymer of the second composite electrolyte layer is polyacrylonitrile (PAN) and the ion conductive ceramic material thereof is $Li_2O$—$SiO_2$.

17. The multi-layer structured composite electrolyte of claim 3, wherein the polymer of the first composite electrolyte layer is polyacrylonitrile (PAN) and the ion conductive ceramic material thereof is $Li_2S$—$P_2S_5$, and the polymer of the second composite electrolyte layer is polyacrylonitrile (PAN) and the ion conductive ceramic material thereof is LGPS ($Li_{3.25}Ge_{0.25}P_{0.75}S_4$).

18. The multi-layer structured composite electrolyte of claim 3, wherein the polymer of the first composite electrolyte layer is polyacrylonitrile (PAN) and the ion conductive ceramic material thereof is LTAP ($Li_{1+x}Ti_{2-x}Al_x(PO_4)_3$) (0<x<2), and the polymer of the second composite electrolyte layer is polyacrylonitrile (PAN) and the ion conductive ceramic material thereof is $Li_2O$—$SiO_2$.

19. The multi-layer structured composite electrolyte of claim 1, wherein another layer is or multilayers are further included between the first composite electrolyte layer and the second composite electrolyte layer.

20. A lithium ion secondary battery comprising the multi-layer structured composite electrolyte for the lithium ion secondary battery of claim 1.

* * * * *